INVENTORS
J. G. PEARCE
W. W. PHARIS
G. O. K. SCHNEIDER
BY Dicke & Craig
ATTORNEYS Dec. 30, 1969 J. G. PEARCE ET AL 3,487,170

UNIVERSAL JUNCTOR

Filed May 23, 1966 20 Sheets-Sheet 2

Dec. 30, 1969 J. G. PEARCE ET AL 3,487,170

UNIVERSAL JUNCTOR

Filed May 23, 1966 20 Sheets-Sheet 3

UNIVERSAL JUNCTOR

Filed May 23, 1966

Dec. 30, 1969 J. G. PEARCE ET AL 3,487,170

UNIVERSAL JUNCTOR

Filed May 23, 1966 20 Sheets-Sheet 5

Dec. 30, 1969 J. G. PEARCE ET AL 3,487,170

UNIVERSAL JUNCTOR

Filed May 23, 1966 20 Sheets-Sheet 6

UNIVERSAL JUNCTOR

Filed May 23, 1966 20 Sheets-Sheet 7

UNIVERSAL JUNCTOR

Filed May 23, 1966 20 Sheets-Sheet 8

Dec. 30, 1969 J. G. PEARCE ET AL 3,487,170

UNIVERSAL JUNCTOR

Filed May 23, 1966 20 Sheets-Sheet 14

Dec. 30, 1969 J. G. PEARCE ET AL 3,487,170

UNIVERSAL JUNCTOR

Filed May 23, 1966 20 Sheets-Sheet 16

UNIVERSAL JUNCTOR

United States Patent Office 3,487,170
Patented Dec. 30, 1969

3,487,170
UNIVERSAL JUNCTOR

James G. Pearce, William W. Pharis, and Gerhard O. K. Schneider, Rochester, N.Y., assignors to Stromberg-Carlson Corporation, Rochester, N.Y., a corporation of Delaware Filed May 23, 1966, Ser. No. 552,283
Int. Cl. H04m 3/22
U.S. Cl. 179—18 32 Claims

ABSTRACT OF THE DISCLOSURE

Universal junctor circuit connected between a line link network, a trunk line network and a service link network for providing both originating and terminating control over the establishment, supervision and maintenance of telephone communications in conjunction with a junctor processor circuit. The universal junctor circuit includes both controls and sensors connected via an electronic scanning circuit in a time division mode to the supervisory processing circuit which incorporates the necessary logic circuitry to evaluate and act on the information derived from the sensors as to the line circuit condition in comparison with and together with the results of previous information concerning the line circuit condition which is stored in a particular segment of the memory allocated to the junctor.

The present invention relates in general to telephone systems, and more particularly to a fully automatic electronic common control system for effecting complete and automatic control over the transmission between subscribers including all of the necessary functions for establishing a call, monitoring the call, and performing the necessary steps requested by the subscriber through connection of common equipment to the transmission path.

Previous efforts in the design of common control systems have been plagued by the high cost of access equipment for associating common equipment with transmission circuits. This access equipment has taken the form of special networks, sometimes referred to as service link networks, through which association is made between the various common circuits necessary for setting up and monitoring a call and the transmission circuits. In these arrangements, separate junctors are provided for originating and terminating purposes with the line link network, being used first for association with the common circuits and then for association with the transmission circuits. In providing separate junctors for both originating and terminating purposes, the cost of the access equipment is greatly increased and the control complexity and increased storage necessary for such a system renders such a scheme highly impractical, especially for small telephone systems with small memory capabilities.

A common control system of the present invention provides a single programmed control circuit for use with electronic telephone systems in lieu of the multiple originating and terminating junctors utilized in prior systems for associating common equipment with the transmission circuits. This common control circuit may, for example, be associated with a register sender system, such as disclosed in application Ser. No. 300,557 of James G. Pearce et al., filed Aug. 7, 1963, now Patent No. 3,312,786, wherein a single all electronic system is provided for storing information regarding the called and calling subscribers, such as routing digits for the called parties and class of service for the called and calling parties, and for making this information available for purposes of processing a call in a fully automatic manner.

The present invention provides for a substantial reduction in control equipment through provision of a universal junctor circuit which is used for both originating and terminating purposes and a junctor processor circuit associated with a plurality of universal junctor circuits on a time division multiplex basis so as to make possible complete control and supervision of a plurality of calls through the service link network on a time sharing basis. The universal junctor circuit provides for connection of the common circuits, dial tone applicator, ring control, add-on conference, etc., to the calling and called subscriber line circuits, and connection between the calling and called subscriber line circuits under control of the junctor processor circuit, which automatically performs such functions as receipt and storage of dialed pulses, reference to the register sender equipment for information regarding the calling and called parties and connection of the common circuits through the junctor to the subscriber line circuits for processing and completing a call. The junctor processor circuit is also equipped to continuously monitor the call while simultaneously making available shared equipment to other universal junctor circuits and for extending auxiliary equipment, such as add-on conference or malicious call arangements to the junctor after a call is established.

Basically, the universal junctor circuit is provided as a slave having both sensors and controls. The sensors are connected via an electronic scanning circuit in a time division mode to a supervisory processing circuit which incorporates the necessary logic circuitry to evaluate and act on the information derived from the sensors as to the line circuit condition in comparison with and together with the results of previous information concerning the line circuit condition which is stored in a particular segment of the memory allocated to the junctor. The junctor controls are provided for operation or release of the various relays in the junctor circuit under control from the common register processor in the register sender equipment and the common circuits which are applied thereto through the service link network.

The junctor memory may be either recirculating or random access, but in any case, it provides a special segment allocated to each junctor to which it is sequentially connected on a time share basis providing one word consisting of subscriber information regarding the calling and called parties, line conditions of the subscriber circuits, a counter for determining interpulse time intervals and various control indications provided by the common register processor in response to circuit and line conditions. The electronics scanning of the junctor and junctor memory are controlled so that when a particular junctor is being scanned, access is made to its memory segment and at this time the common supervisory processing circuit is allotted to this particular junctor for so long as a scanner is connected to it. The supervisory processing circuit examines and acts on the stored information in the memory and information received from the sensors as to the line condition, and as a result of this information, it either connects through a register buffer to the common register processor for storage of the information or to the service link network control for control of the various relays in the junctor circuit.

The register buffer which interconnects the supervisory processing circuit with the common register processor provides a means for associating the scanner which is used for building up dialed digits and which operates on a time division multiplex basis with the common register processor for storing the digits, and which is provided on a traffic basis. Since the supervisory processing circuit and the common register processor operate asynchronously the buffer provides a means for accepting data from the supervisory processing circuit holding this information and then applying the information to asynchronously controlled circuits whenever they are available.

Under control of the common register processor, connection is made between the junctor and the line circuit of the called party and the ringing control is connected through the service link network and the junctor circuit to this line circuit. When the called party answers the call, connection is made through the junctor with the line circuit of the calling party and the junctor processor circuit, with the exception of the supervisory processing circuit of the junctor memory, are free for control of other transmission circuits. The reduction in the required control equipment with this automatic system and consequent economic advantages derived therefrom are obvious.

It is an object of the instant invention to provide a common control system which utilizes a minimum of controlled circuitry for effecting fully automatic control and monitoring a plurality of transmission circuits.

It is another object of the instant invention to provide a universal junctor circuit of both originating and terminating functions.

It is a further object of the instant invention to provide a universal junctor circuit capable of association on a time share basis with the various common circuits needed for establishing a call.

These and other objects, features and advantages of the instant invention will become more apparent from the following detailed description when taken in conjunction with the accompanying drawings, which disclose one embodiment of the invention and wherein.

Figure 3A:
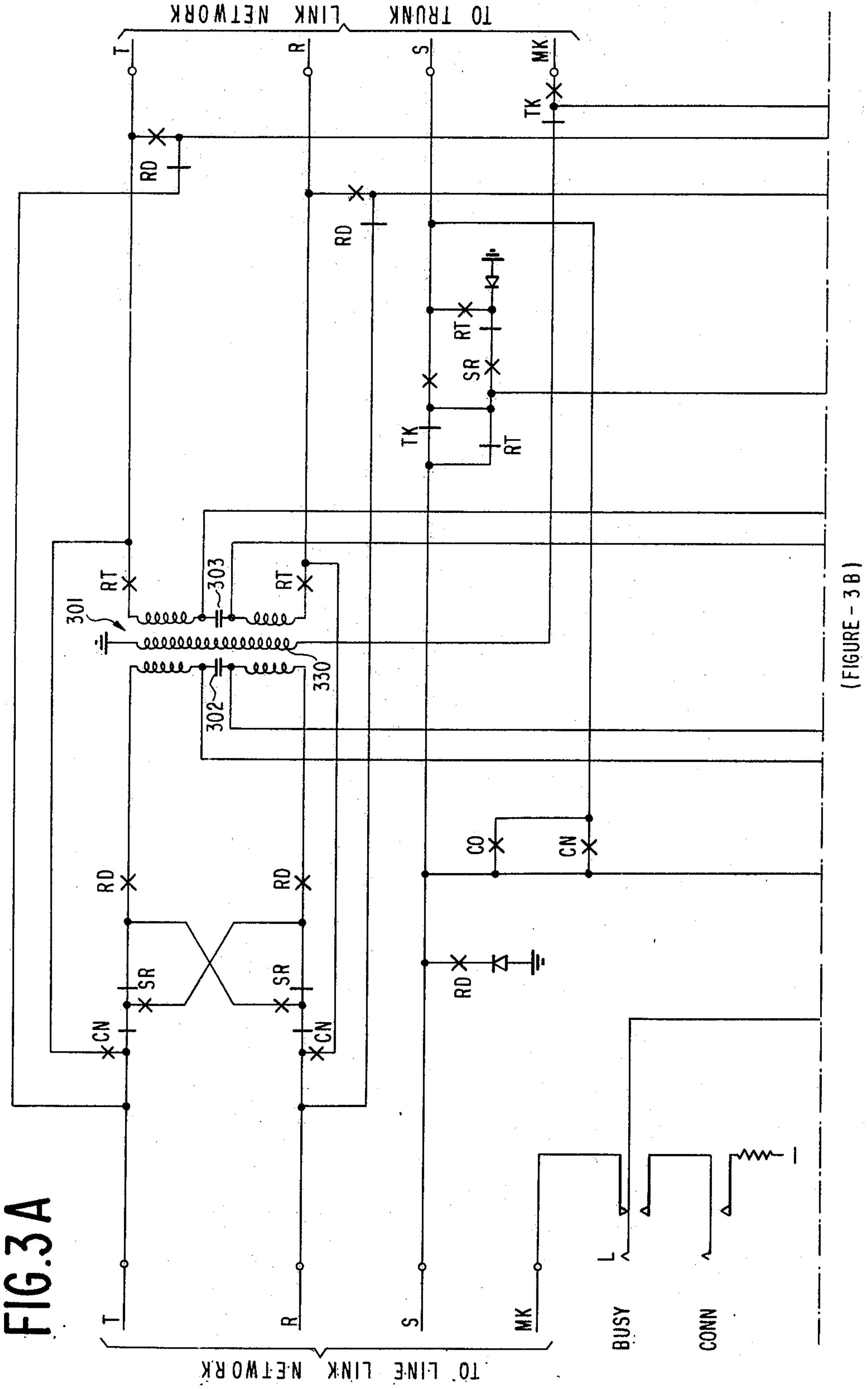
Figure 3B:
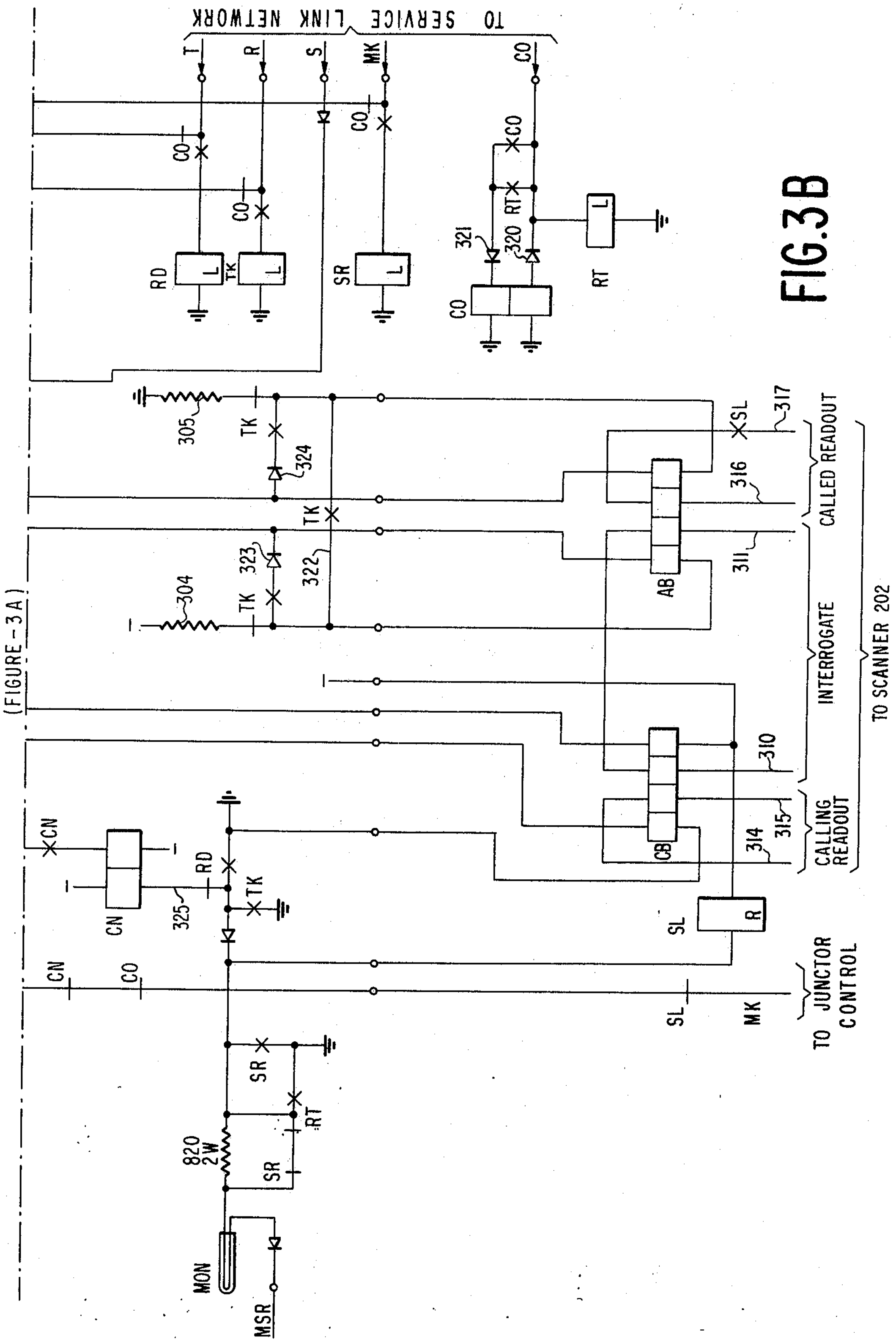
Figure 4:
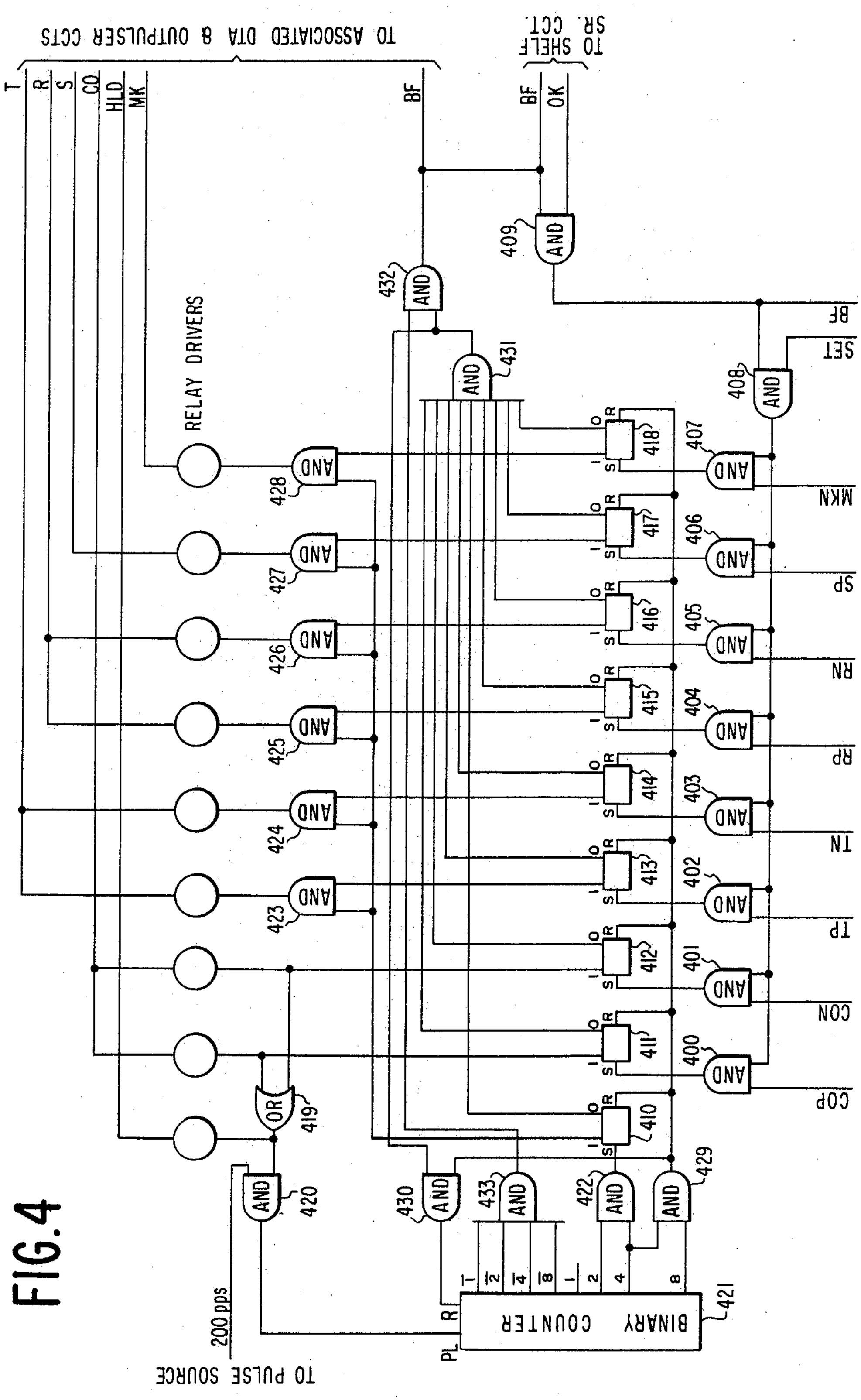
Figure 5A:
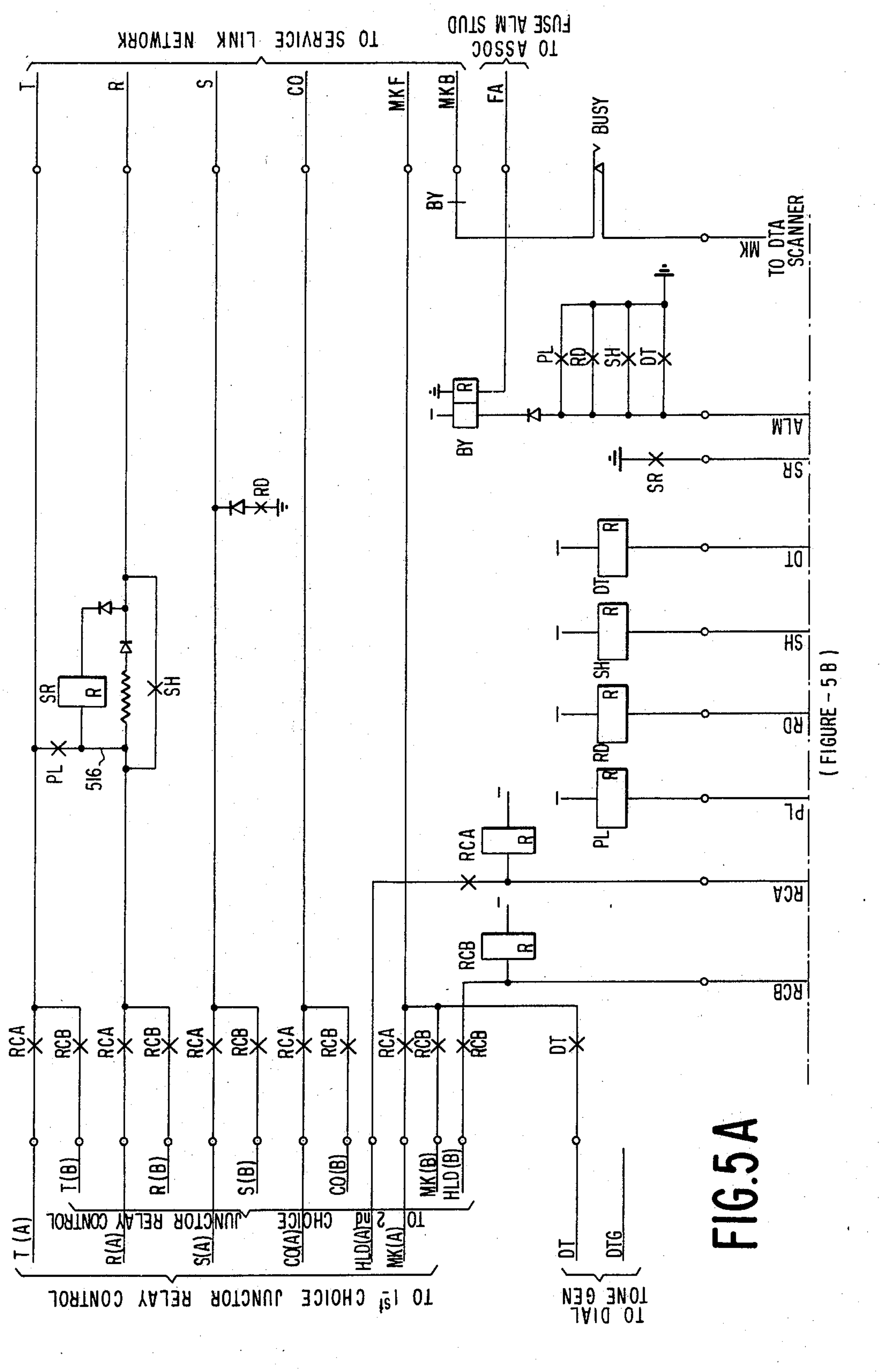
Figure 5B:
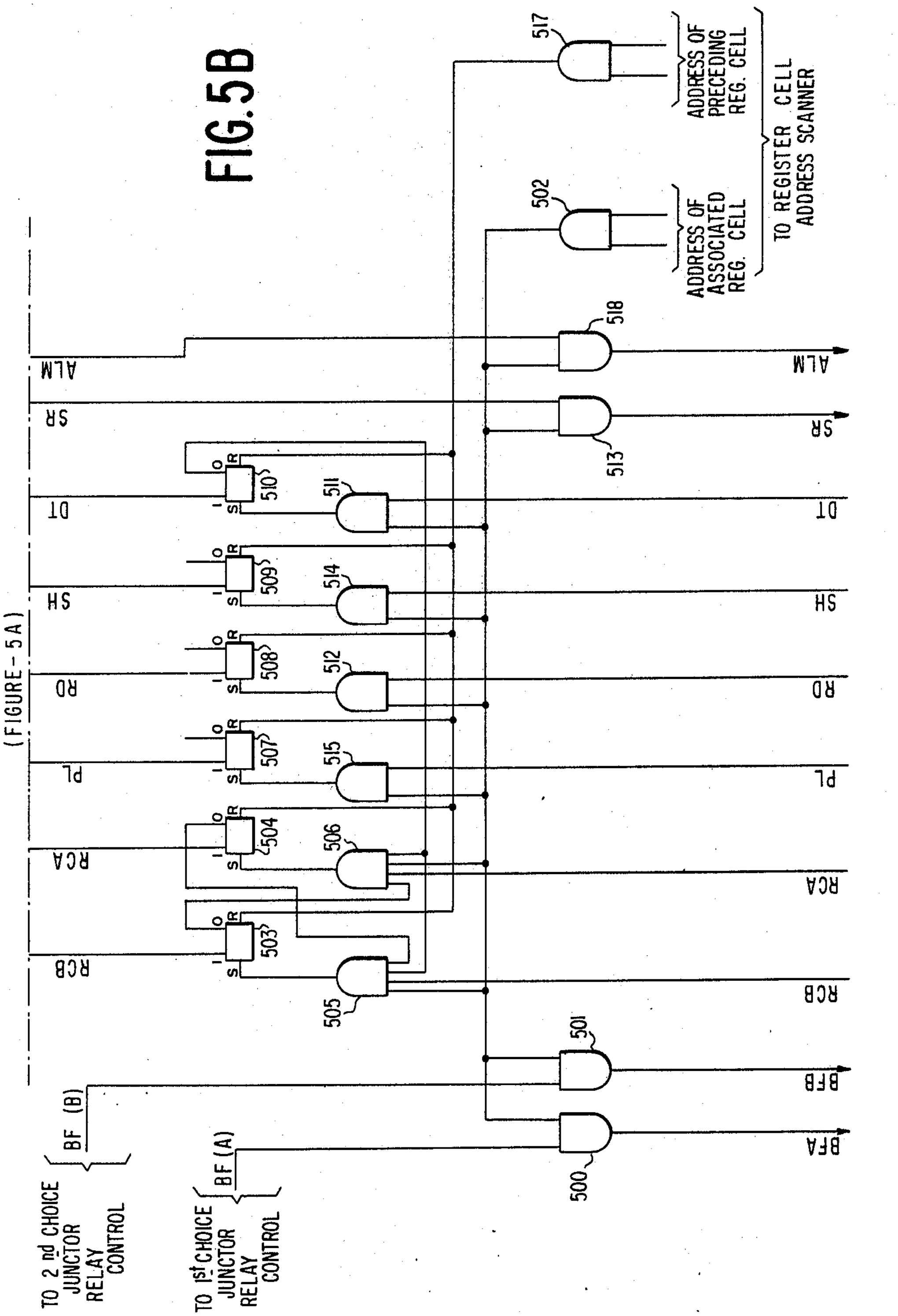
Figure 6A:
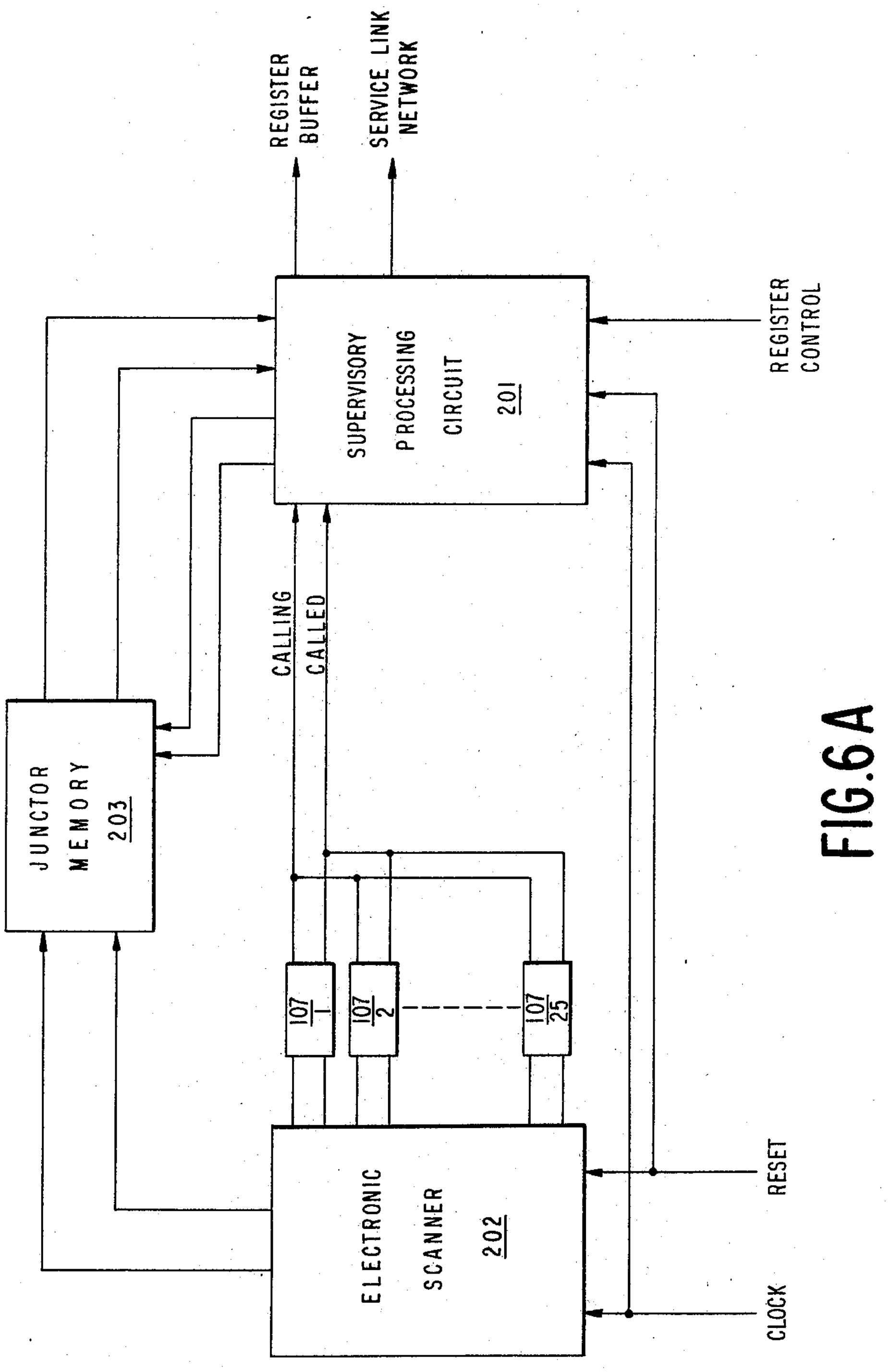
Figure 6B:
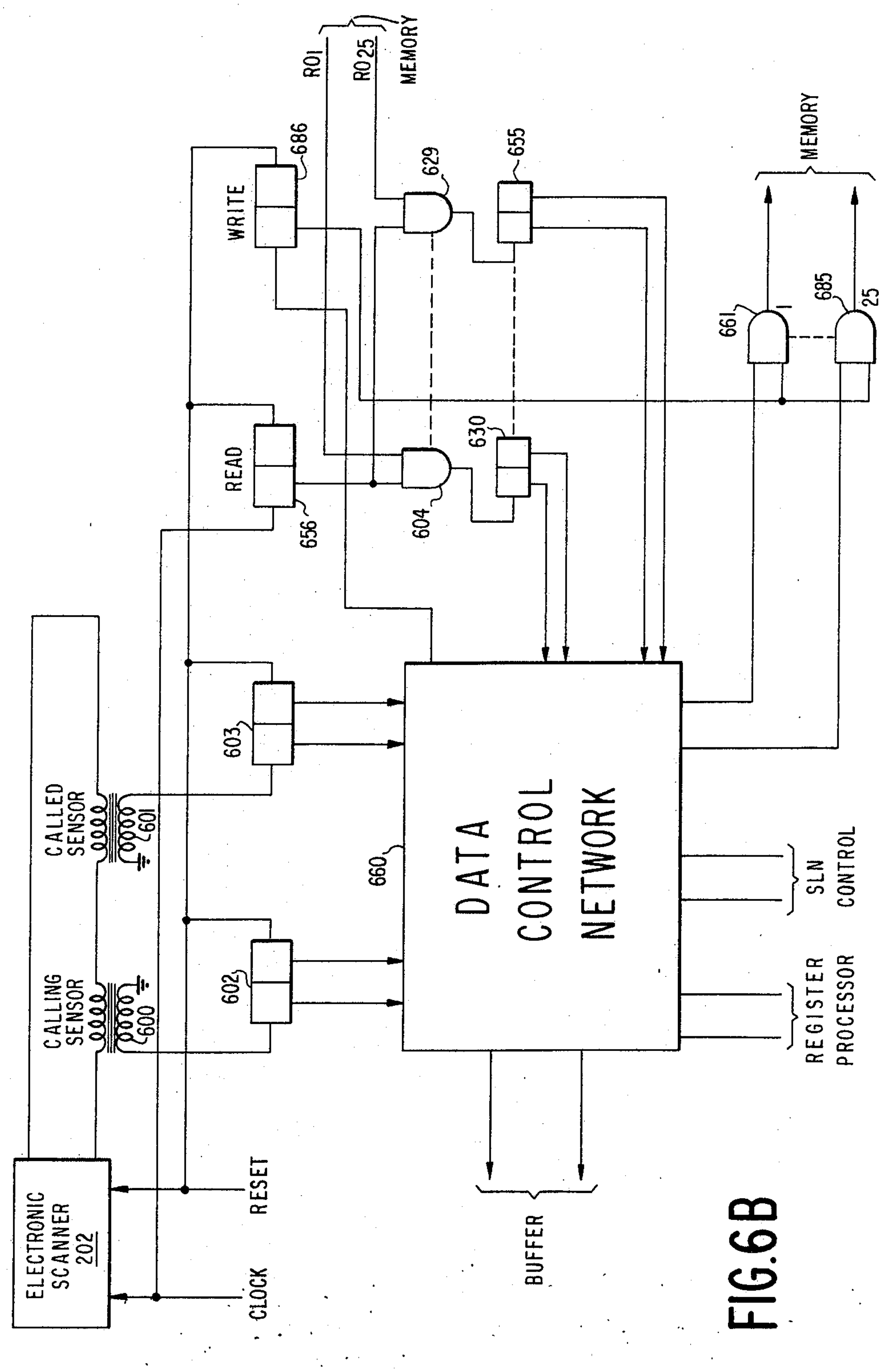
Figure 7A:
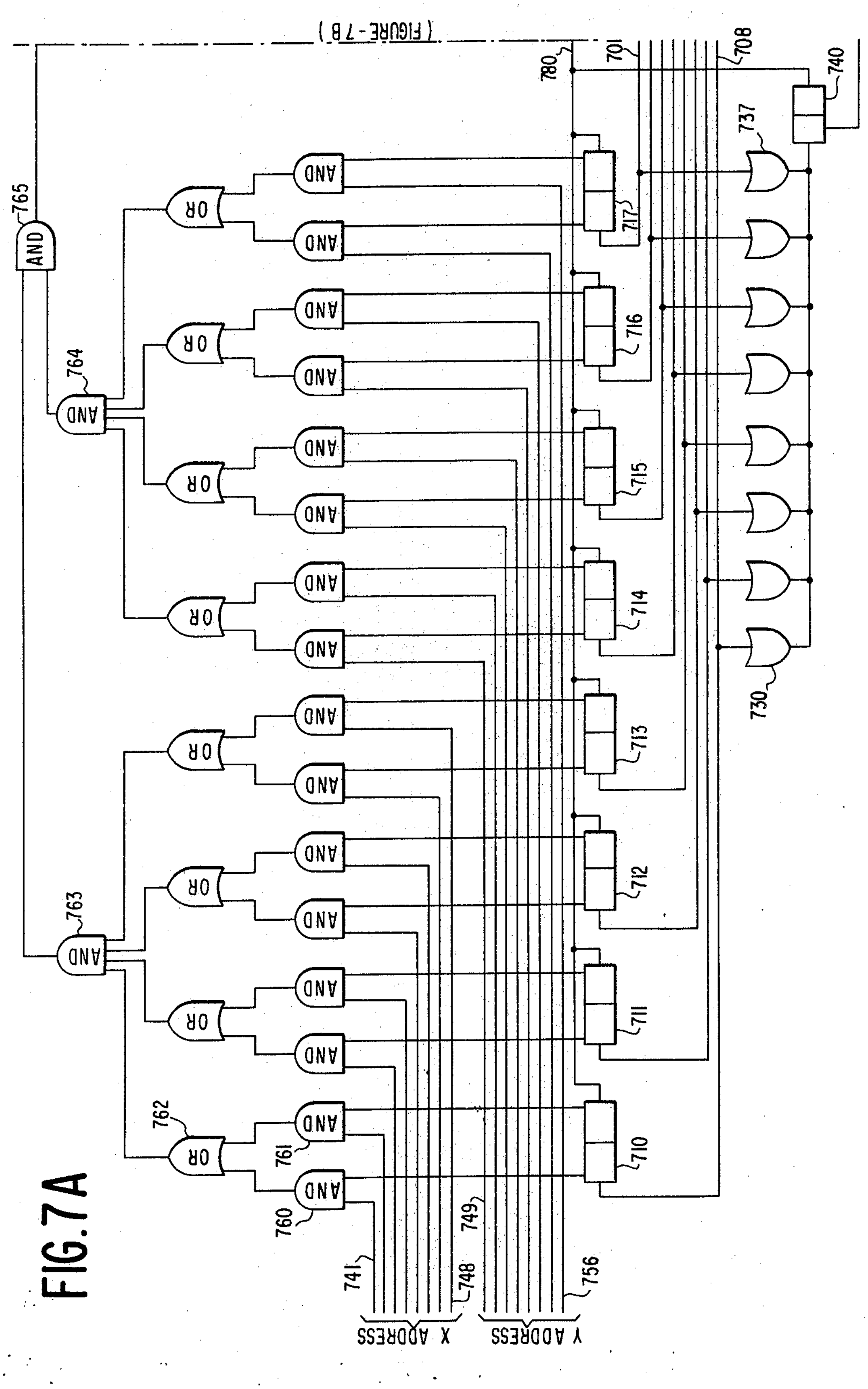
Figure 7B:
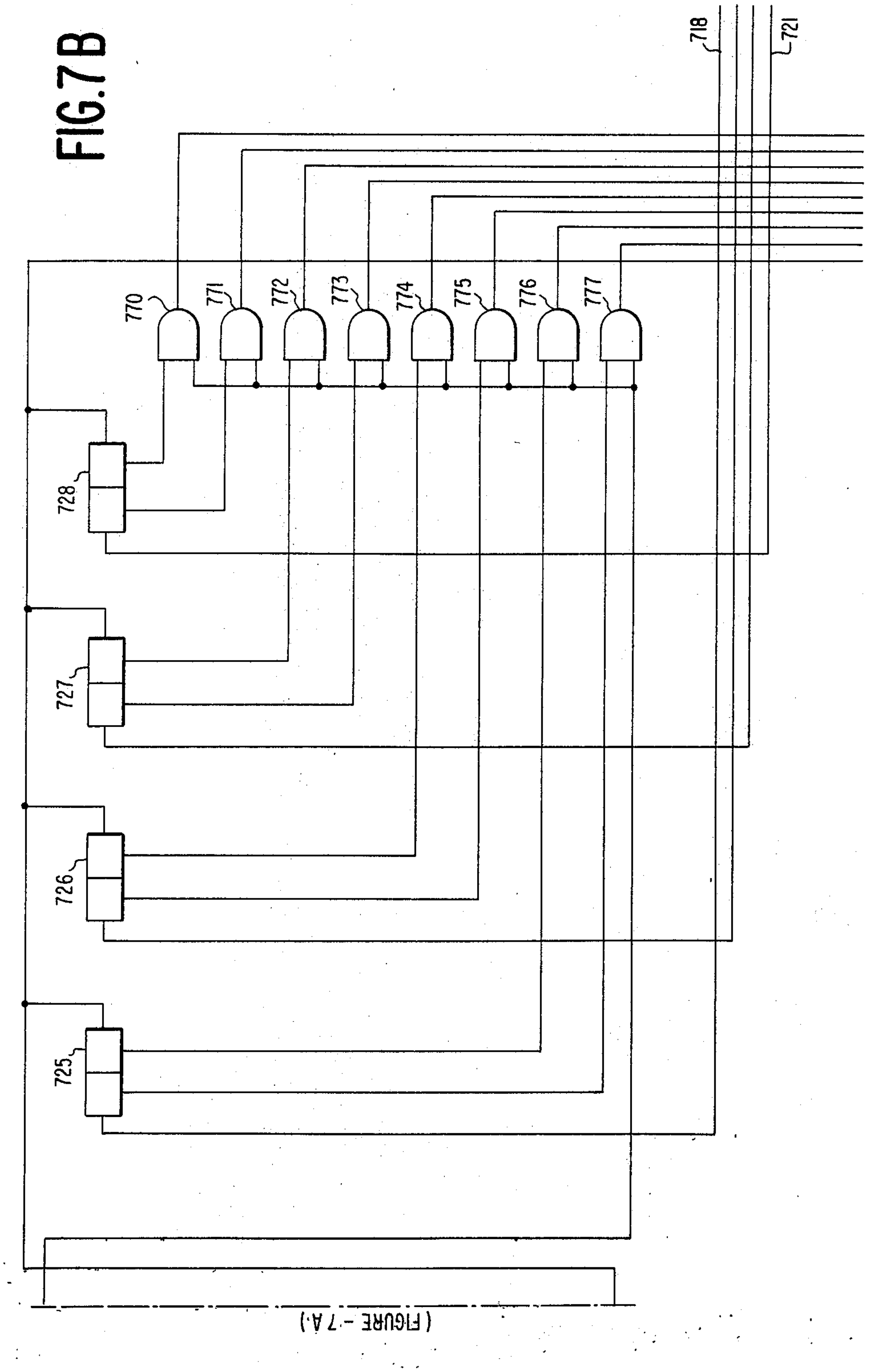
Figure 8:
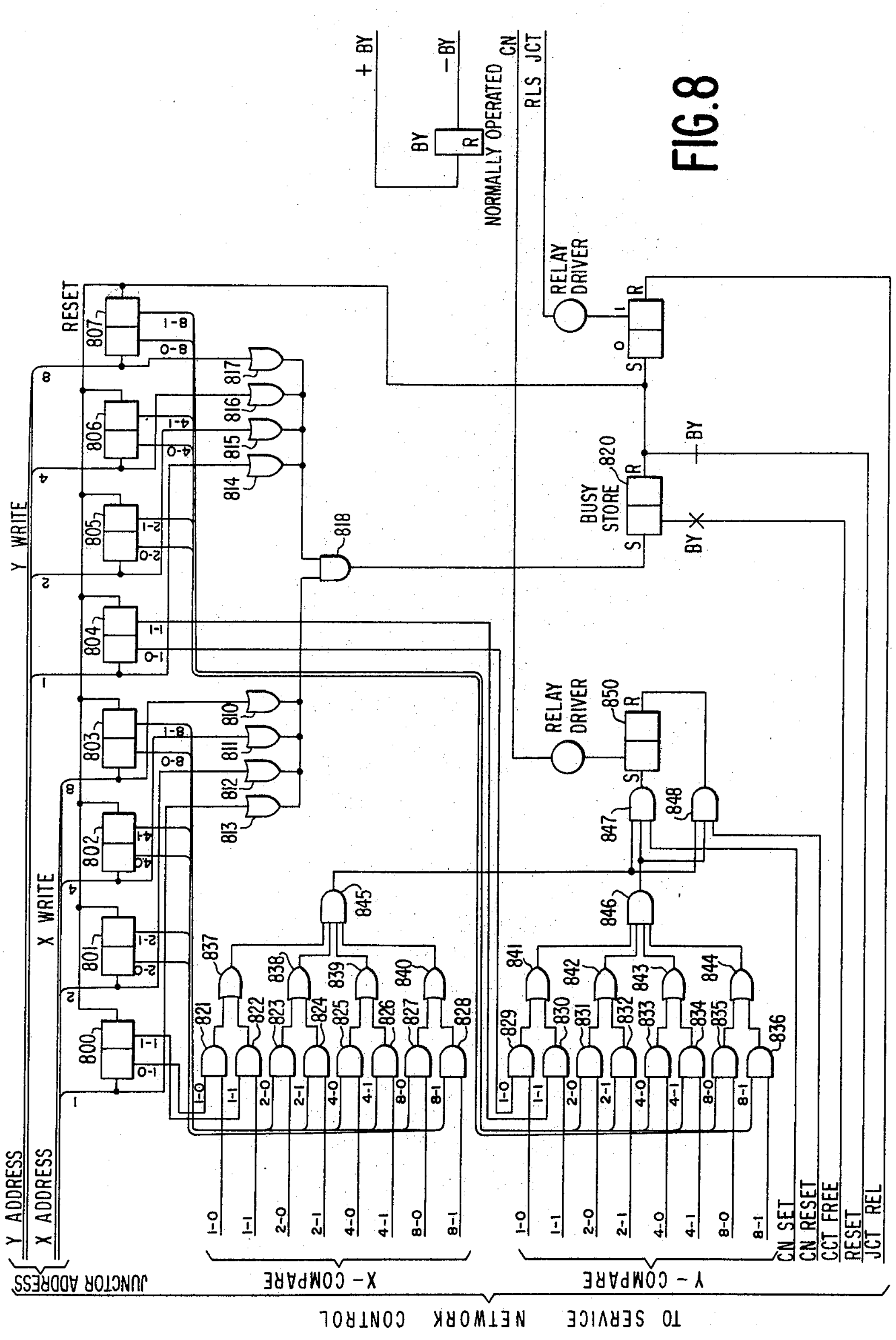
Figure 9A:
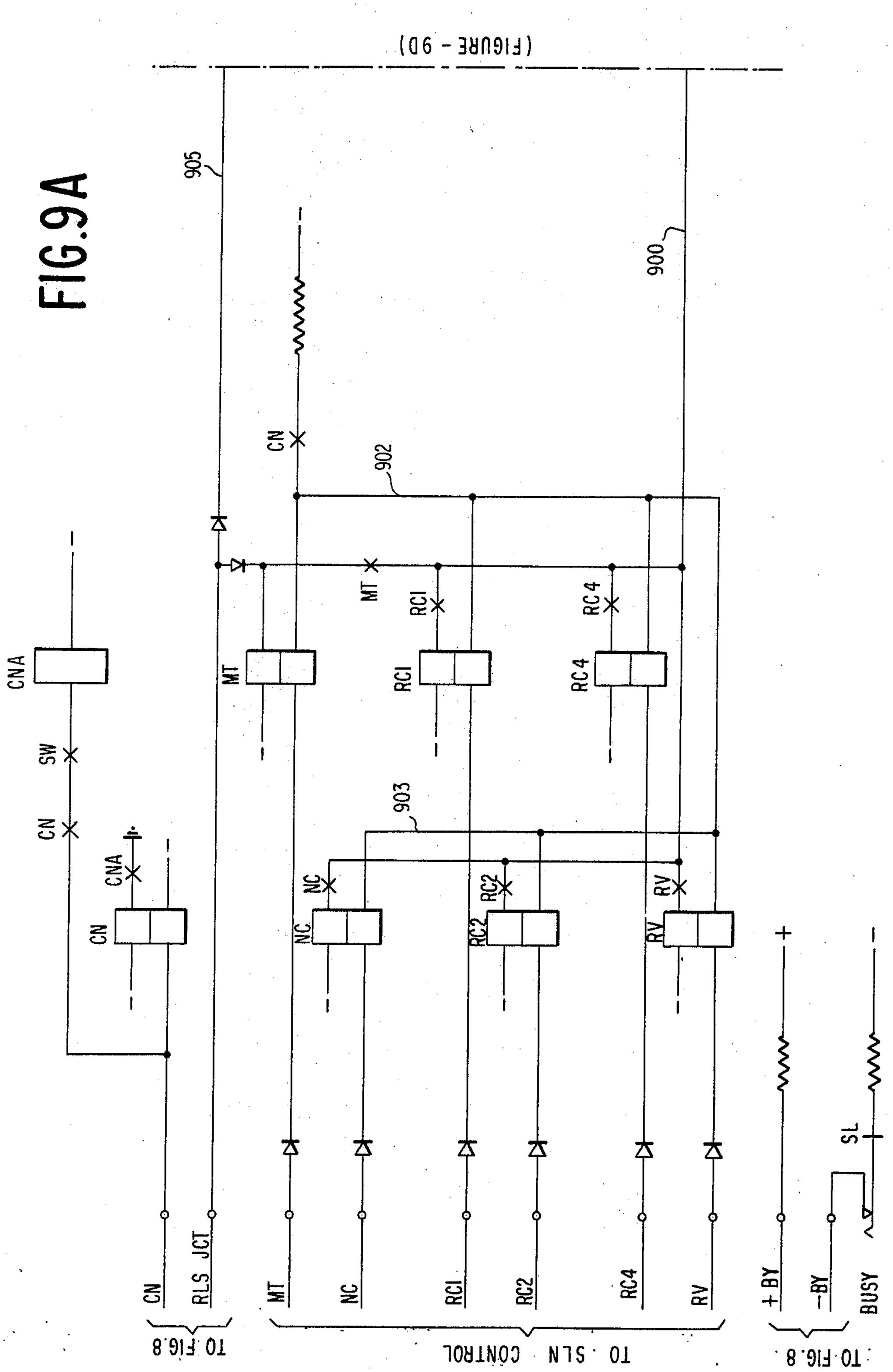
Figure 9B:
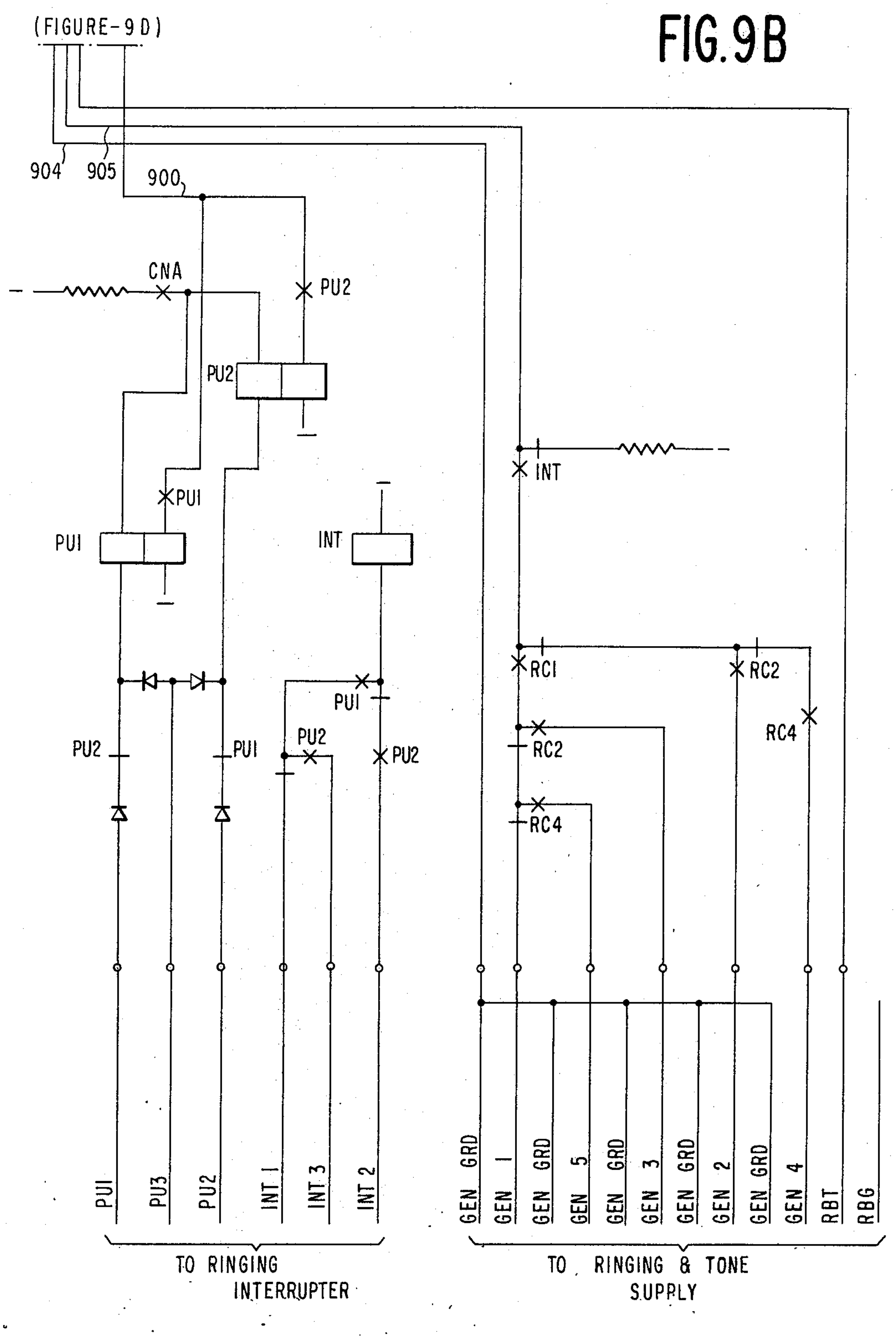
Figure 9C:
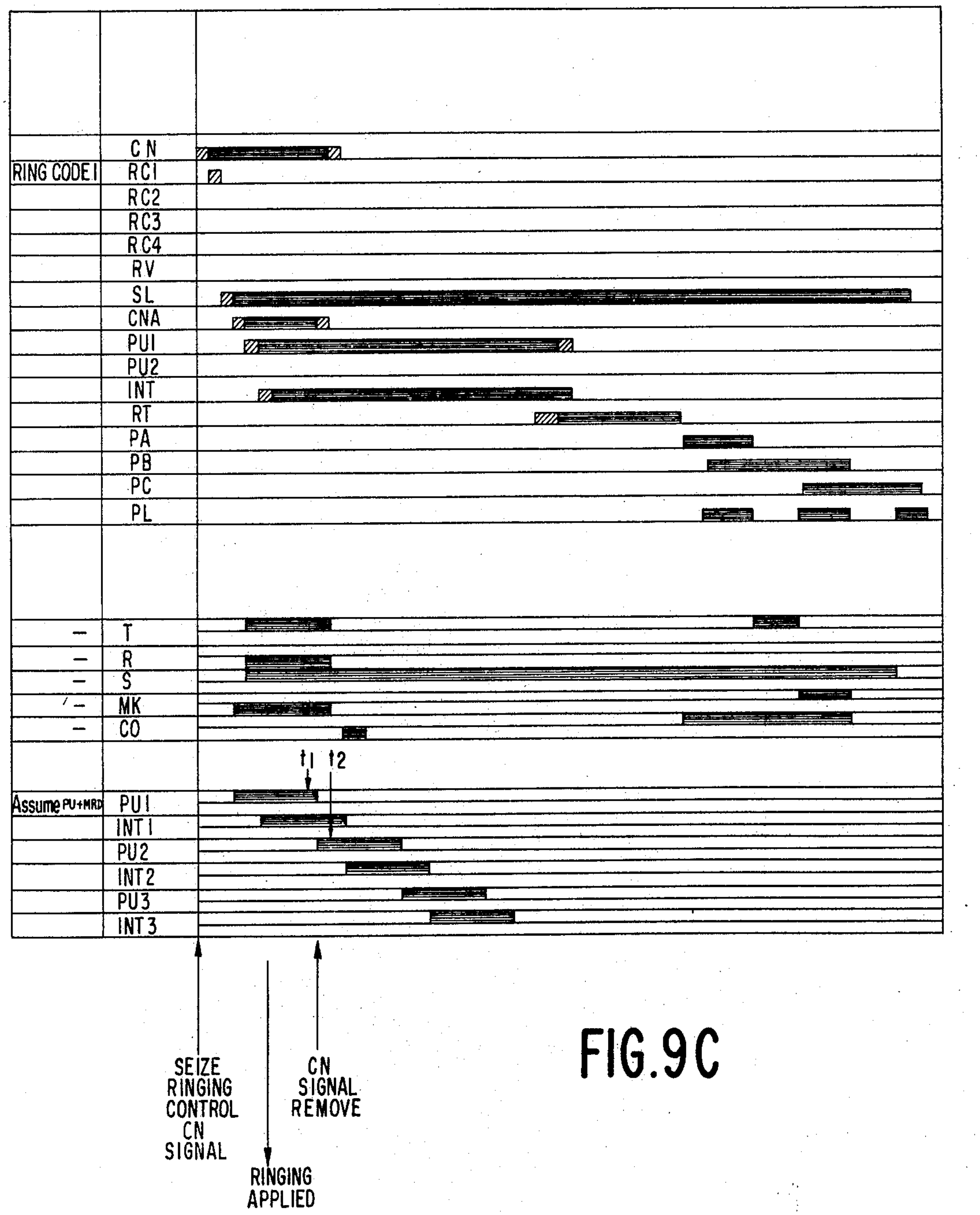
Figure 9D:
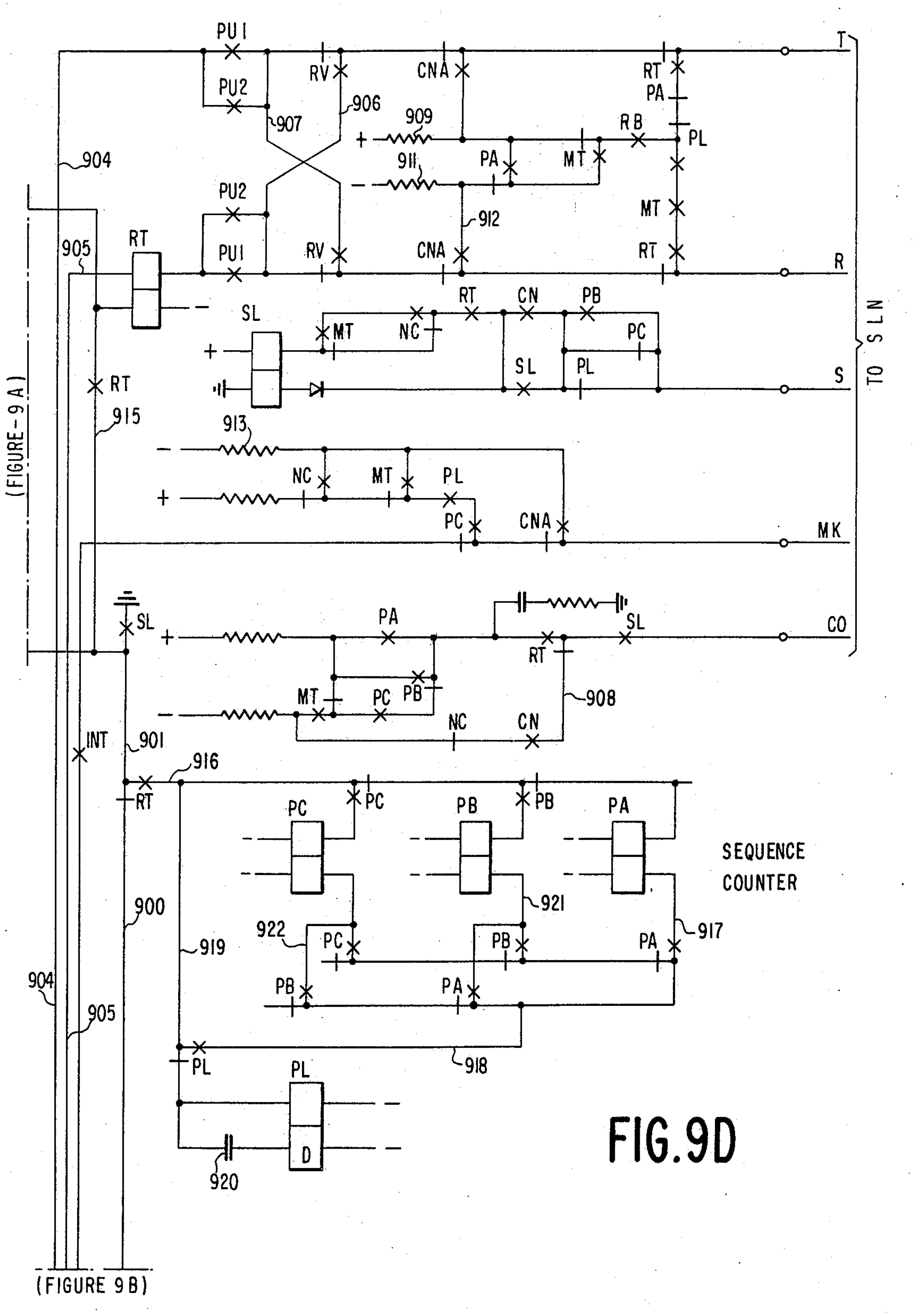
Figure 10A:
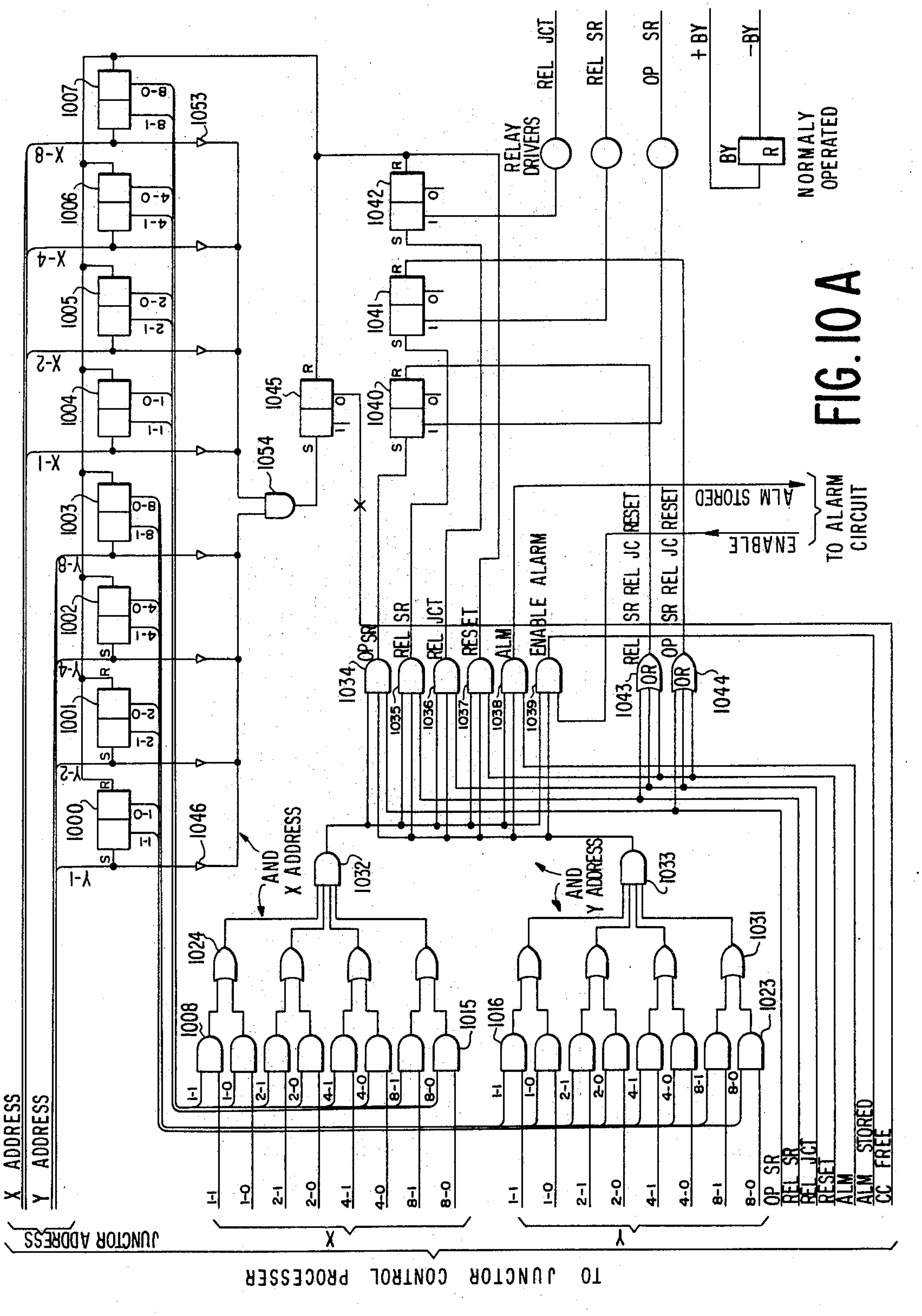
Figure 10B:
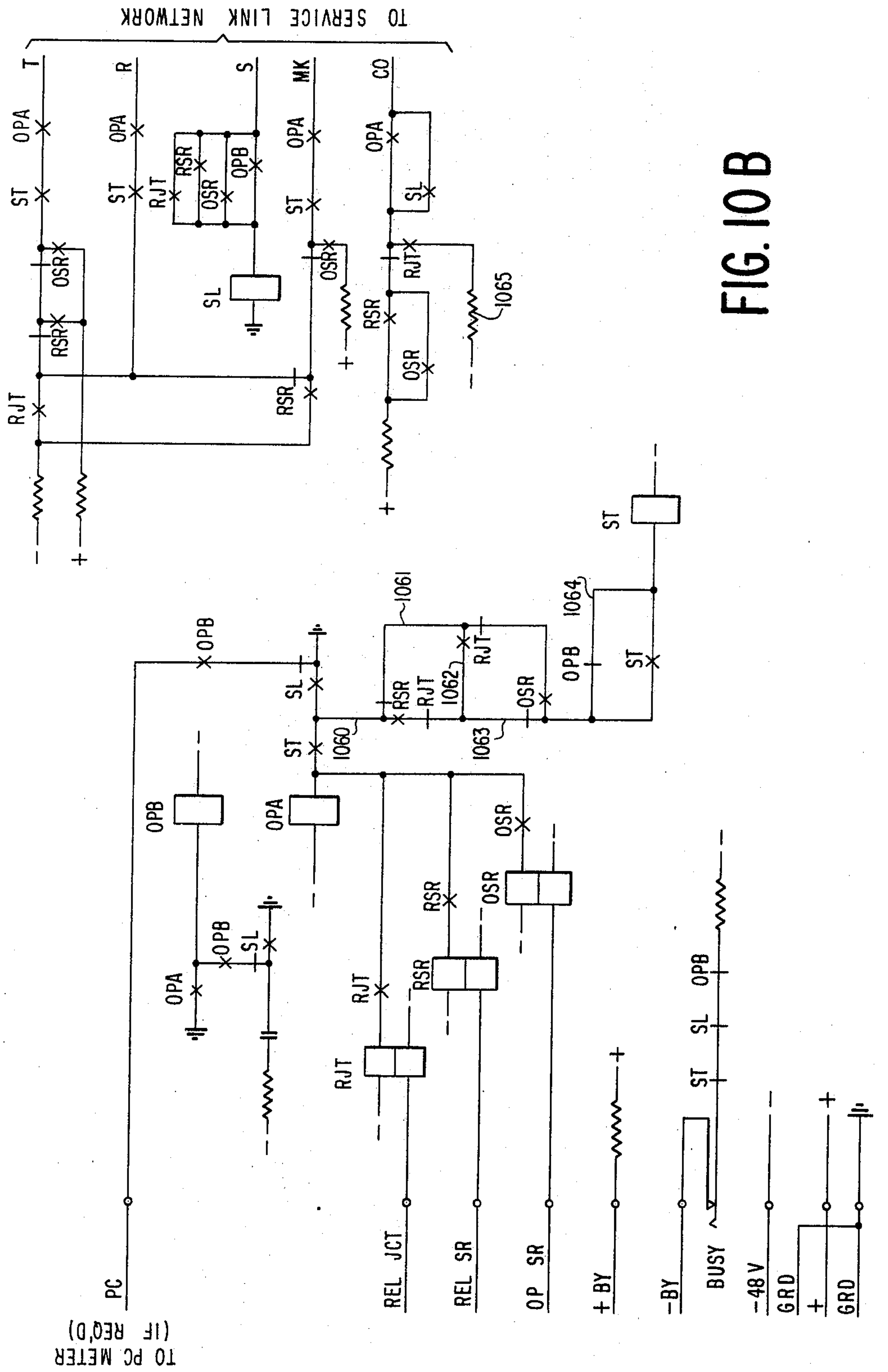

FIGURES 3A and 3B provide a circuit diagram of the junctor in accordance with the invention;

FIGURE 4 is a schematic diagram of the junctor control circuit in accordance with the invention;

FIGURES 5A and 5B are schematic diagrams of the dial tone applicator and outpulser circuit;

FIGURE 6A is a general block diagram of the interrelationship between the plural junctors, junctor memory, scanner, and supervisory processing circuit;

FIGURE 6B is a general schematic diagram of the supervisory processing circuit;

FIGURES 7A and 7B are schematic diagrams of the buffer circuit used with the instant invention;

FIGURE 8 is a schematic diagram of the electronic portion of the ringing control in accordance with the invention;

FIGURES 9A, 9B, and 9D are schematic diagrams of the electromechanical portion of the ringing control;

FIGURE 9C is a table indicating the proper timing of the functions carried out by the ringing control of FIGURES 8, 9A, 9B and 9D; and FIGURES 10A and 10B are schematic diagrams of the junctor release control in accordance with the invention.

OVER-ALL SYSTEMS OPERATION

Figure 1A:
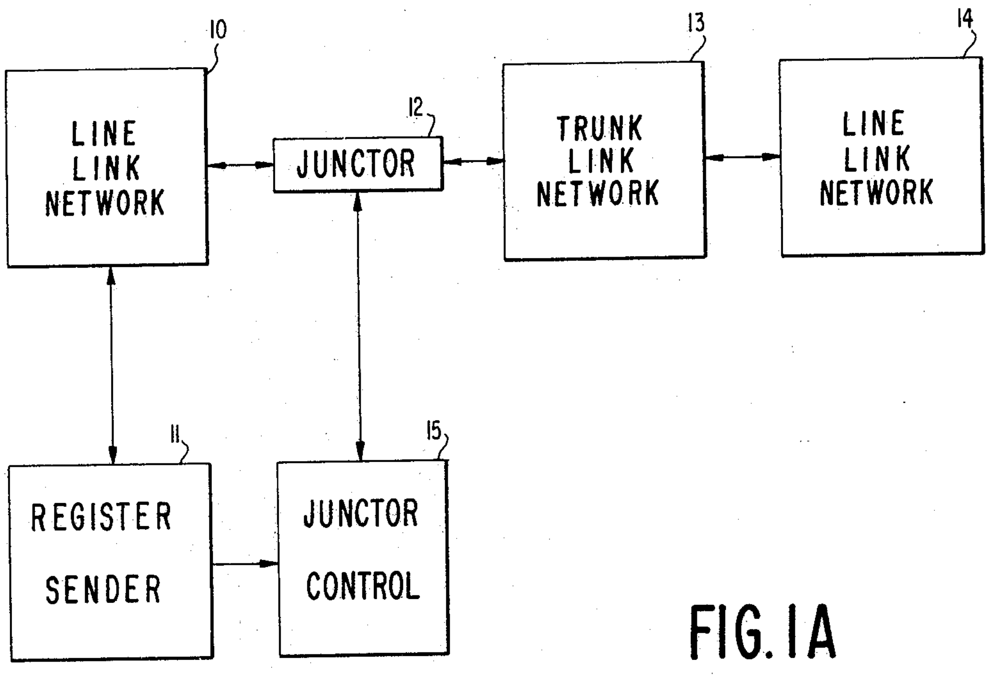
FIGURE 1A is a general block diagram of a telephone system utilizing the instant invention.

Referring first to FIGURE 1A, there is illustrated a basic block diagram of a telephone system comprising a line link network 10 including a plurality of line circuits, a trunk link network 13 and either the same or a distant line link network 14 connected to the trunk link network. A register sender 11, such as disclosed in the aforementioned application Ser. No. 300,557 of James Gordon Pearce et al., for example, may be connected to the line link network 10 for acting during the initial stages of establishment of a call from a calling subscriber to provide proper routing information in response to dialed digits received through a universal junctor circuit 12 and a junctor control circuit 15, in accordance with the invention, and to mark the calling and called line circuits, so that in cooperation with the junctor control 15 and universal junctor 12 a connection may be made therebetween.

Figure 1B:
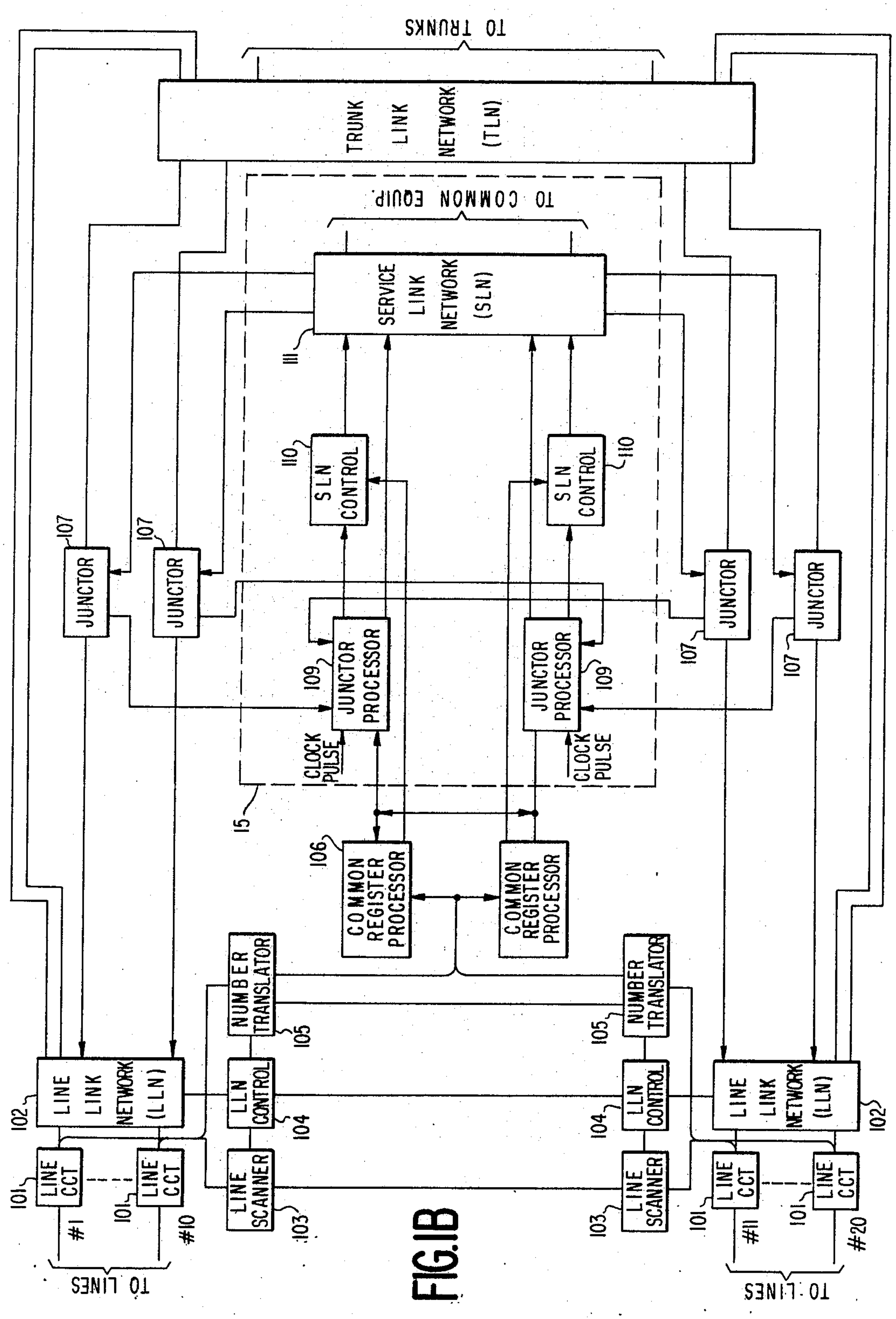
FIGURE 1B is a more detailed block diagram of the system of FIGURE 1A.

FIGURE 1B illustrates in somewhat greater detail an over-all schematic block diagram of the system of FIGURE 1A including the programmed junctor circuit of the invention. A plurality of line circuits 101 are connected in groups of ten to line link networks (LLN) 102 of which there are two provided in the illustrated embodiment for purposes of showing how a plurality of lines may be controlled by the invention. However, it should be understood that additional line link networks may be provided in the over-all system through interconnection of the control circuitry in the well known manner. A line scanner 103 is provided for each line link network 102 and is connected to each line circuit 101 associated therewith. The line scanner 103 is in turn connected to a line link network control 104 which, upon receipt of information from the line scanner as to an open line circuit condition, locates the open line and marks it via the line link network 102.

The line link network control 104 is connected to a number translator 105 which is also connected to the line scanner 103 and serves to provide information regarding the directory number of the line which is calling and of the required routing and class of service information. Connected to the number translator 105 and in accordance with its internal program memory controls the line link network control 104 to mark the calling line upon receipt of necessary information from the number translator 105 as translated from the dialed information from the calling subscriber. The system described to this point is similar to the register sender system described in the aforementioned application Ser. No. 300,557 of James Gordon Pearce et al.

In the particular embodiment of the instant invention, a plurality of universal junctor circuits 107 which connect the line link network 102 through a trunk link network 108 back to the line link network 102 to outgoing trunk circuits as required are associated with junctor processor circuits 109 on a time division multiplex basis, the junctors associated with each junctor processor circuit being scanned repeatedly every ten milliseconds by the junctor processor to monitor the condition of the line circuits to which the individual junctors are connected. The junctor processor 109 detects the condition of the line circuit to which the individual junctor 107 is connected, returns dial tone to the calling party in response to control by the common register processor 106, detects dialed impulses via the line link network 102 and junctor 107, applies the dialed digits and other information regarding the condition of the line circuit to the common register processor 106, applies ringing and ring back to the called and calling parties in response to control from the common register processor 106 and controls the relays in the junctor 107 via a service link network control 110 and service link network 111 to provide connection between the various common circuits through the junctor to the calling and called line circuits. The junctor processor 109 also continuously monitors the transmission circuits to which the junctors 107 associated therewith are connected to provide supervisory control and response to service requests by either the calling or called parties.

Figure 2A:
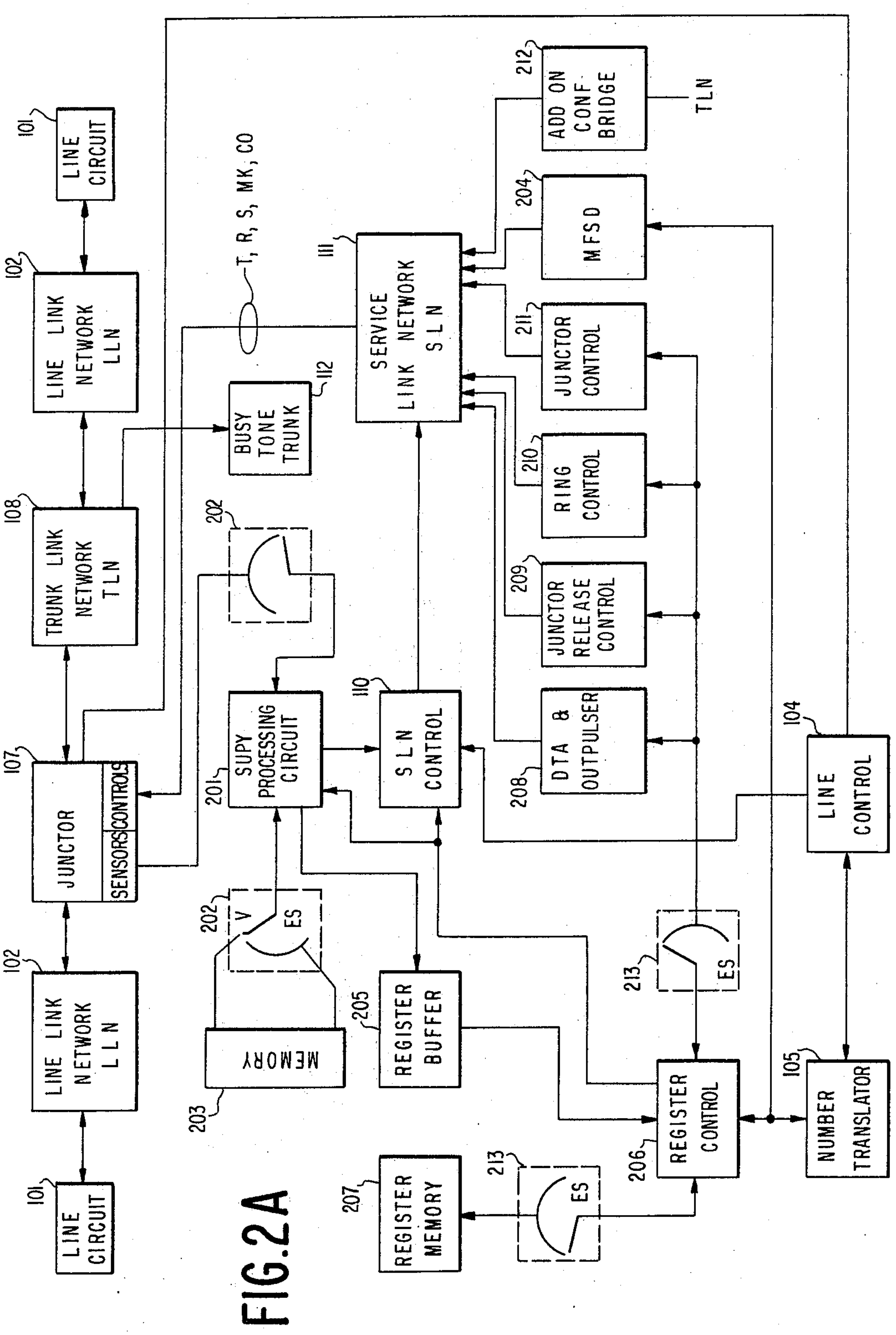
FIGURE 2A is a block diagram illustrating the components of the invention and therein association with the other elements of the system.

A general block diagram of the junctor processor 109, together with a single junctor 107 to which it is periodically connected, the service link network 111 and service link network control 110 in accordance with the embodiment of the instant invention are illustrated in FIGURE 2A. The junctor circuit 107 provides an interface between the line link network 102, the trunk link network 108 and the service network which includes the service link network 111, the service link network control 110, the junctor processor 109 and the common register processor 106 in the register sender. This junctor serves both as an originating and terminating junctor. The junctor circuit is arranged so that it has no inherent decision-making circuitry and therefore is a slave to a processing control which obtains access to the calling and called lines via the sensors in the junctor itself.

Each junctor 107 is connected to a junctor processing circuit previously designated 109 and now called the supervisory processing circuit 201 on a time share basis by an electronic scanner 202 which simultaneously connects a junctor memory 203 to the supervisory processing circuit with the interconnection between the circuit elements being effected at the time when a segment of the memory 203 allocated to the particular junctor is available. This supervisory processing circuit 201 determines the condition of the line circuit by way of the sensors in the junctor 107 and compares this condition during each scan with the previous condition of the line circuit as stored in the junctor memory 203. Each of the junctors is scanned once every ten milliseconds so that a dialing impulse of 20 millisecond duration will be detected at least twice, thereby determining that it is a dialing impulse rather than a spurious signal such as an intermittent contact or other meaningless indication.

Figure 2B:
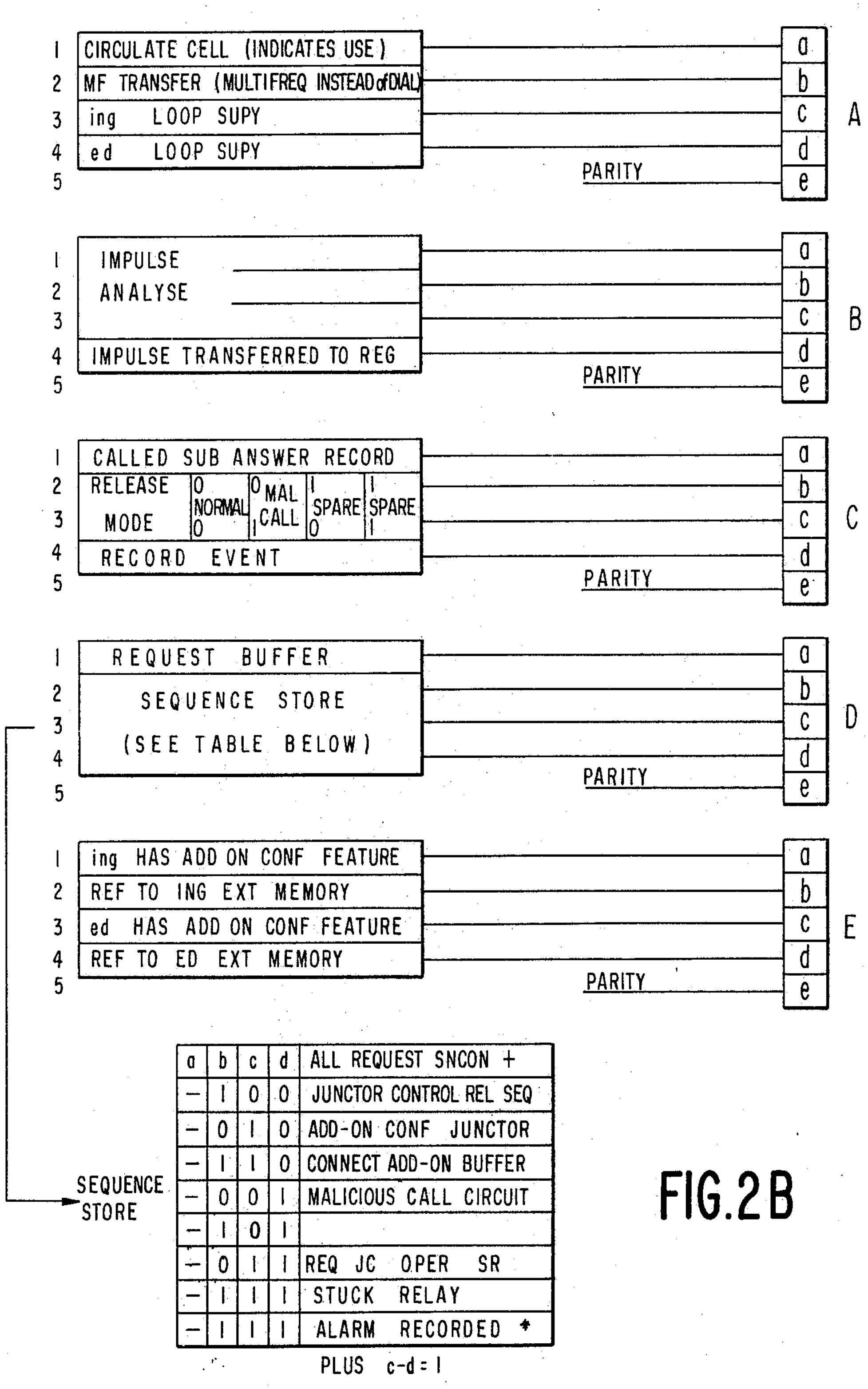
FIGURE 2B is a table indicating the allocation of the various information bits to particular subject matter.

The memory 203 will contain a segment for each junctor which is periodically connected to the associated supervisory processing circuit 201. In other words, there will be as many segments in the memory 203 as there are junctors 107 associated with a given supervisory processing circuit 201. The memory 203 may be either recirculating or random access and each segment of the memory typically contains 25 bits of information or instruction as shown in FIGURE 2B although it should be understood that any convenient number of bits can in fact be used. The 25 bits of the memory are divided into five bit characters, of which the fifth or last bit of each character is provided as a parity or checking bit. The bit characters provide for a grouping of the bits into semirelated functions such as monitoring of the line circuits, timing functions, and various instructions utilized for control of the service network. The bits which make up each character within each segment of the memory are schematically disclosed in FIGURE 2B. These characters may be regarded as subregisters for retaining binary bits which are continually being altered and which are a function of data derived from the particular junctor associated with that segment of the memory and data derived from the common register processor.

The first character A of FIGURE 2B of each segment is used to indicate that the segment is in use. A bit in position 1 in character A indicates that the segment is in use and permits the writing or manipulation of information in the other characters in the memory segment. If no such bit occurs in the first position, then information available to the memory is not recorded and no action is taken on such information. A bit in position 2 of the first character A indicates that transfer is multifrequency instead of dial, as for instance, if the call is originating from a tone dial telephone. In a case of a bit in this second position, the supervisory processing circuit connects through the service link network control in the service link network to a multi-frequency signal detector 204 transferring the multi-frequency signals to this circuit element for translation and direct application to register control 206. Bits in positions 3 and 4 of character A of the memory segment indicate the state of the calling and called loops, respectively, a bit indicating an open line condition and an O indicating a closed line condition. The fifth position of character A as in the other characters of the memory segment is reserved for the parity or checking bit.

The second character B of the memory segment is used for impulse analyzing and controls the analysis of the durations of time for which the calling or called line is open or closed. Positions 1, 2, and 3 of character B provide for a three bit binary counting sequence. These three bits are used to keep a record of the length of time for which the calling loop is either open or closed. The method whereby this is achieved is as follows:

At the particular interval of time during which a particular junctor is associated with the junctor processor 109 the state of the calling loop is recorded. Ten milliseconds later when the same junctor is again scanned the state of loop is again examined. If the state is the same as it was previously the counter is stepped one and thereby records the fact that the loop is opened for a period long enough to constitute either an impulse or the final release conditions of the call. The discrimination between these two states is accomplished by reversing the function of the sensor and checking for a change of state of the calling loop from off-hook to on-hook. If the open circuit represents an impulse then the change of state of the loop will occur within a defined period. On the other hand, if the call has been terminated then no such change of state will be recorded, and, hence, the counter will reach its maximum position as an indication of this. The three bits, therefore, keep a record of the time of opened or closed loop conditions.

The fourth position of character B of the memory segment provides indication of whether or not an impulse received by the junctor and sensed by the supervisory processing circuit has been transferred to the common register processor 106. The fifth position of the character contains the parity bit.

Character C of each memory segment is utilized as a monitoring of line conditions and functions within the control system and also serves as a means for effecting release or connection of time shared equipment. A bit in the first position of character C is used to record the fact that the called subscriber has answered so that special sequences of events may be initiated which relate to functions required after the callee has answered. For example, a bit in the first position of character C indicating that interconnection between the calling and called subscribers has been completed, serves as a means for distinguishing impulses received over the calling or called lines as a flashing condition requiring recalling of time shared equipment, rather than a dialing condition which would require a different sequence of events. This first position of character C is also used to indicate that the called loop may instigate a release condition if the loop called remains open for greater than an assigned or predetermined period of time. The second and third positions in character C in each segment are used for release modes and control the manner in which the call can be released. For example, specific combinations of the two bits are allocated to a normal release (00) and to a malicious call (01). Under the malicious call release a sequence of events can be started—when the calling party releases—to hold the line circuit to the calling party until tracing of this circuit can be completed. The fourth position of the character C serves as a means of recording occurrence and completion of a sequence of events and provides a sort of scratch pad note to be made of this fact, which information is utilized in control of any following sequences. The fifth position of character C provides the parity or checking bit.

The fourth character D consists largely of a sequence store which determines what action has been taken by the processing circuit 201 when it has been seized. The first position of this character is used for instruction purposes to request the buffer 205 for transferring impulses or information for the supervisory processing circuit to the common register processor 106. The second, third, and fourth positions of the character provide various combinations of bits which indicate the various sequences which have been carried out by the control system. For example, indications that the signal network control has been seized and either a junctor control is associated with the call in order to release the junctor, or that the signal control has to be seized and an add-on conference junctor connected through the service link network and the junctor to the transmission circuit is indicated by the various bit combinations indicated as FIGURE 2B. In response to insertion of the bits in the proper positions in character D requiring certain sequences or the request of a buffer, control is effected through the service link network control and service link network to the various common circuits, which are available on a time share basis, for acquisition into the system at that time. The fifth position of the character D provides the parity or checking bit.

The character E contains basic information as to the classes of service of the calling and called subscribers with position 1 of the character indicating whether or not the calling party has add-on conference features, position 2 indicating necessity to refer the calling party to an external memory in order, for example, to accommodate abbreviated dialing from a caller. Positions 3 and 4 of the character perform similar operations as positions 1 and 2 but refer to the called subscriber. Position 5 of the character provides the parity or checking bit.

Referring once again to FIGURE 2A, the supervisory processing circuit 201 examines and acts upon the stored information in the memory and information received from the systems in the junctor 107 and as a result of this information it either connects to a register buffer 205 or to the service link network control 110. The service link network control 110 controls the crosspoints in the service link network 111 so as to interconnect the various common circuits with the junctor in control thereof. The register buffer 205 provides a means of associating the scanner, which is used for building up dialed digits, with the supervisory processing circuit and junctor memory operating on a time division multiplex basis with registers which store the digits and are provided on a traffic basis. In view of the asychronous operation between the supervisory processing circuit 201 and the common register processor 106 a speed buffer of some type is required in between the two circuits so that information may be transferred from the supervisory processing circuit 201 during a given scan of the junctor 107 and the junctor memory 203 with storage of the information or impulses in the register buffer 205 being provided until access is available to the common register processor 106.

The common register processor 106 includes a register control 206 which performs timing and control functions and serves to transfer received impulses to the register sender system for further processing. Associated with the register control 206 on a time share basis is a register memory 207 and a dial tone applicator and outpulser circuit 208. The register memory 207 provides a segment for each of a plurality of dial tone applicators and outpulsers 208 and is capable of storing the address of the junctor associated with the outpulser circuit and retaining dial impulses for transfer via the register control 206 to the number translator 105 in the register sender.

The dial tone applicator and outpulser 208 controls the initial setting up of a call including application of dial tone and control of receipt of dialed impulses to the supervisory processing circuit in response to the register control 206. The register control 206 also provides control via the service link network control 110 and the service link network 111 of the various common circuits which are to be connected metallically through to the junctor. Either the supervisory processing circuit 201 or the register control 206 are capable of effecting such a metallic connection between the common circuits and the junctor via the service link network control 110 and the service link network 111 in response to control functions set up in either of these circuits.

The common circuits which perform the necessary service control may include, for example, a junctor release control 209, a ringing control 210, a junctor control 211, multi-frequency signal detector 204 and add-on conference bridge 212. However, it should be understood that other common circuits in addition to those specifically described and illustrated, such as a malicious call circuit, etc., may be provided in the system on a time share basis in the manner of the other common circuits. The common circuits may consist of an electronic or electromechanical portions, or of electromechanical portions only.

A brief description of the sequence of events and functions which make up the control procedure for setting up a call will provide a clearer understanding of the functions and relationships between the various circuit elements which are described above. At the time a call is originated, the line scanner 103 detects an open line in a line circuit 101 and signals line link network control 104, which through the line link network 102 seeks out the open line and marks it in the conventional manner. At the same time, the line control 104 scans the junctors and dial tone applicator-outpulser circuits to find an available one of each which is not at that time in use. The available DTA circuit 208 and junctor 107 are each marked to indicate seize condition and the address of the selected junctor 107 is inserted via the register control 206 into the registor memory 207 in the segment therein reserved for the particular DTA 208 which is marked. An electronic scanner 213 is provided between the plurality of DTA circuits 208, the register control 206, and the register memory 207 so that the register control is connected in turn to each DTA circuit at the time which its particular segment of the register memory 207 is available to the register control 206.

The DTA and outpulser circuit 208, the operation of which is described in detail hereinafter, causes the calling line to be extended from the line link network 102 to the junctor 107. This enables the junctor sensors to detect the condition of the calling loop and by comparing the state of the loop with the previous state stored in the junctor memory 203 in the supervisory processing circuit 201, an indication of the open condition of the line circuit can be inserted into the junctor memory 203 and control can be effected via the register control 206, DTA and outpulser circuit 208 and junctor control 211 to apply dial tone through the service link network 111 and junctor 107 back to the calling subscriber.

The calling subscriber now dials and the supervisory processing circuit 201 connected to the sensors in the sensors in the junctor 107 builds up the impulse and digits received and signals these to the register buffer 205. The register buffer has a means of storing the address of the junctor 107 which is transferring information at a given time. The buffer 205 therefore receives not only impulse information or instruction but also the junctor address so that upon comparison of the junctor address stored in a given segment of the register memory 207 with the address stored in the register buffer 205 by the register control 206, a transfer of the information in the register buffer through the register control 206 to the register memory 207 will be effected at the time when access is available to the segment in the memory to which the information is to be applied. The register control is arranged to scan the register buffer at regular intervals, and each time the register buffer 205 is checked against a given register memory segment, a check is made for the presence of the junctor address, which was stored when the register was first alloted to the connection, and if such an address identical to the memory segment is encountered, then the instruction character in the register buffer is transferred to the register control 206 and the register memory 207. In this way, the dialing pattern is processed by the supervisory processing circuit 201, analyzing on and off hook signals by measuring intervals in order to determine change of impulse and detect digits.

At any time that the change in condition of the line circuit is detected via the junctor sensors by the supervisory processing circuit 201 counting is initiated by a counter in the junctor memory 203 in character B thereof, bits 1, 2 and 3, to provide a means of monitoring and recording the time intervals between impulses and after control functions have been performed, such as application of dial tone to a calling line, and also be determine an end of digit condition. Whenever an impulse or an end of digit is recognized, then this information is transferred to the register control 206 together with the address of the junctor from which the information was received. When the register control has received a digit, reference is made to a translator 105 which determines whether the destination of the call is local or whether an outgoing trunk is required. The number translator 105 also provides indication as to whether or not the digit or digits received are sufficient to require further operations or whether or not additional digits will be necessary before further control will be required.

When the last digit of a local number has been received, control circuitry is utilized to determine whether the called line is busy or free. If it is found busy, the register control 206 with the dial tone applicator and outpulser 208 mark forward through the service link network, the calling junctor 107, and the trunk link network 108 to an available busy tone trunk 112. The calling line is then extended through the junctor 107 and the trunk link network 108 to the busy tone trunk 112 to return busy tone to the calling subscriber. At that time, the service link network 111, the dial tone applicator and outpulser 208 and register control 206 are released for use in connection with another call.

If a called number is found to be free after the last digit is received, the register control 206 effects connection of the ring control 210 through the service link network 111, the calling junctor 107, and the trunk line network 108 to the called subscriber equipment. The ringing code and class of service, if any, of the called subscriber are obtained from the register control via the number translator 105. At this point, the register control 206 and the dial tone applicator and outpulser 208 may be released. A metallic path has now been established from the ringing control 210 via the cross points of the service link network 111, the junctor 107, the trunk link network 108, the line link network 102 to the called line, ringing is applied over this path to signal the called station and ring back is applied to the calling subscriber. When the called party answers the ringing is tripped, the transmission circuit is extended through the junctor 107 from the calling line to the called line, and the service link network 111 and ringing control 210 are released. The called line sensor in the junctor 107 is now connected to the called line, except in metallic switch-through operations, and thus the supervisory processing circuit 201 can keep account of the state of both the called line loop and the calling line loop. The supervisory processing circuit now checks for flash or release from either the calling or called line; the flash in conjunction with the proper class of service of the flashing party as determined by the information stored in character E of the segment associated with the junctor 107 in the junctor memory 203 will permit connection of the junctor 107 via the service link network 111 to appropriate control circuits of trunks such as the add-on conference trunk 212 or malicious call trunk, etc., which are not shown.

With the supervisory processing circuit 201 continously monitoring the condition of the calling and called line circuits, the opening of either of these line circuits indicating an "on hook" condition by either subscriber will be detected in the supervisory processing circuit which will then acquire the SLN control 110 and service link network 111 once again. When the opening of the calling line circuit is detected through the junctor 107 by the supervisory processing circuit 201, the SLN control 110 initiates the release sequence by the connection of the junctor release control 209 through the service link network to the junctor 207 thereby freeing the junctor and the remaining service equipment in a manner to be described in greater detail hereinafter.

THE JUNCTOR CIRCUIT

In accordance with the instant invention, the junctor circuit provides both sensors for detecting the condition of the calling and called line circuits and suitable controls for connecting via the service link network 111 the various common circuits which are necessary to effect service control for the system. This junctor additionally serves as both an originating and a terminating junctor incorporating a transformer bridge having a saturated inductor sensor in both the calling and called sides. The junctor circuit is arranged so that it has no inherent decision-making circuitry but is a slave to a processing control derived from the supervisory processing circuit and the register control. A schematic circuit diagram of the junctor circuit is illustrated in FIGURES 3A and 3B.

The main voice transmission path through the junctor is by way of the tip T and ring R leads from the line link network through the transformer bridge 301 to the trunk link network 108. A calling bridge CB in the form of a saturable core transformer has its input windings connected on either side of a DC isolation capacitor 302 in the calling side of the transmission bridge 301 with the opposite ends of the input windings connected to ground and negative DC respectively. Thus, upon closing of the calling line circuit, a DC path is completed from ground through the input windings of the calling bridge CB to negative DC voltage saturating the core of the transformer. Similarly, with an open condition of the line circuit, the path through the input windings of the calling bridge CB will be open and the core will remain unsaturated.

An answering bridge AB is provided on the called side of the transmission bridge 301 with its input windings connected on either side of the DC isolation capacitor 303 between ground potential and negative DC through the resistors 304 and 305, respectively. As in the calling bridge CB, a closed line circuit to the called subscriber will provide a closed path from ground through the input windings of the answering bridge AB to negative DC voltage saturating the core of the bridge while an open line circuit will provide no such complete path through the input windings, leaving the saturable core of the bridge in an unsaturated condition.

The condition of the calling and called line circuits connected to the junctor are monitored through an application of an interrogate or read pulse through the read windings of the calling bridge CB and answering bridge AB, which windings are connected in series through leads 310 and 311 to the electronic scanner 202, which pulses these windings every 10 milliseconds to determine the condition thereof. If the calling or called line circuits are open an output pulse will be generated in the output windings and applied to the junctor supervisory processing circuit 201 via leads 314 and 315 from the calling bridge or via leads 316 and 317 from the answering bridge, as the case may be. However, if a line circuit is closed indicating an "off hook" condition, the core of the bridge associated with this line circuit will become saturated due to the closed circuit through the input windings of the bridge, and so application of an interrogate or read pulse to the input windings of the bridge will result in no signal output from the read-out windings thereof. Thus, the condition of the line circuits is determined by the presence or absence of an output from the read-out windings of the calling bridge and answering bridge in response to continuous scanning or pulsing thereof.

The service link network 111 has five output leads T, R, S, MK, and CO over which the various control signals for effecting the functions associated with the junctor are transmitted. There are six main relays in the control portion of the junctor circuit, each providing a function or functions in response to control transmitted through the service link network 111. The change-over relay CO is a bipolar relay which permits double use of the control leads T, R and MK thereby making it possible to apply different control signals from the service link network to the junctor in a number in excess of the individual leads which interconnect these circuit elements. The change-over relay CO also provides a means for isolating the control leads T and R from the transmission lines T and R during control functions so as to prevent noise transmission along these transmission circuits.

The relay RD which is connected through the control line T to the service link network serves as a means for placing a holding ground on the sleeve lead S back to the line link network and also connects the line link network to the calling side of the transmission bridge 301 so as to make possible a monitoring of this line by the supervisory processing circuit detecting sensors in the junctor. The relay SR which is connected through the control line MK to the service link network provides for a reversal of battery to the calling line circuit upon detection of an "off hook" condition at the called subscriber end of the system.

The relay RT connected to the control line CO to the service link network provides a holding ground forward towards the trunk link network on the sleeve lead S and also connects the line circuit of the called party to the transmission link 301 in the junctor so that a monitoring of the condition of this line circuit by the supervisory processing circuit through detection of sensors in the junctor can be effected. The relay RT shares this line with the change-over relay CO and operates in conjunction with this relay such that depending upon the polarity of the signal applied to the control lead it is possible to either operate the change-over relay CO and the relay RT simultaneously or to effect operation of the change-over relay CO and release of the relay RT.

Each of the relays in the junctor is a latching relay with the exception of the relay CO, which is a bipolar relay and each of these latching relays is set by a positive pulse and reset by a negative pulse. Thus, application of a negative pulse on the control lead CO will set the change-over relay CO via the rectifier 320, however, the RT relay will remain reset due to the polarity of this pulse. Once the relay CO has been set a positive pulse can be applied to the lead CO which will pass through the rectifier 321 in view of the previously set condition of the relay CO and retain this setting of the bipolar relay, however, due to the polarity of this pulse it will also set the relay RT at this time. On the other hand, if the change-over relay CO is in the reset condition and a positive pulse is applied to the control line CO, the relay RT will first be set and then the relay CO will be set via the rectifier 321. In this way, it is possible depending upon the polarity of the control signal applied to the line CO to set only the relay CO, set both the relay CO and the relay RT, and set the relay RT and then the relay CO in consecutive order. Since the latter operation is substantially instantaneous, it is seen that the relay CO can be set any time with either a positive or a negative pulse applied to the control line CO.

The relay TK connected to the control line R to the service link network provides a means of extending a dry loop toward the trunk link network thereby obviating the need for a trunk circuit when the outgoing trunks are dialable trunks. This is effected by connecting across the capacitor 303 on the called side of the transmission bridge 301 in the junctor by way of the lead 322 and the diodes 323 and 324. This effectively removes DC from the called side of the transmission bridge 301.

The relay CN provides a means of switching through metallically when the call is either to an outgoing trunk or from an ingoing trunk. This relay operates in conjunction with the relay TK, and like relay CO is a bipolar relay. When the relay TK is set, ground is applied to the relay CN via the unoperated contact of RD setting the relay via line 325. This connects the line 326 to the sleeve lead S which maintains a holding ground on the relay CN during the switch-through process.

The junctor also incorporates a winding 330 on the transmission bridge 301, which winding is connected via the control lead MK to the service link network and serves as a means of feeding dial tone or ring back tone towards the calling line on a transformer induced basis.

A relay SL is provided as a special feature of the junctor circuit and serves as a stuck relay control which is activated at the time junctor is freed from a transmission circuit and whenever one of the relays of the junctor remains in the set condition and thereby prevents further access to this junctor until it is determined whether or not the condition is due to a control function or whether it is due to a misfunction of one of the relays in the junctor circuit.

The transmission line MK from the line link network into the junctor is marked when the junctor is connected to the line link network thereby indicating the busy condition or free condition of the junctor, as the case may be.

JUNCTOR RELAY CONTROL

The junctor relay control illustrated in detail in FIGURE 4 is utilized in combination with the dial tone applicator and out pulser circuit 208 to control the junctor relays during the initial stages of setting up a call and also controls the junctor circuit in response to the register processor 106 and supervisory processing circuit 201 to set up the necessary switching combination in the junctor circuit for effecting operations during a call and upon termination thereof. There are preferably two junctor relay control circuits provided in the system for the plurality of dial tone applicator and out pulser circuits 208, which make use of the two junctor relay controls on a time share basis. Of course, additional junctor relay control circuits, or only one circuit, may be provided without departing from the spirit and scope of the instant invention in accordance with the requirements of the overall system.

As indicated above, as soon as an open line cricuit is detected and the condition signalled to the line link network control 104, a sequence of events is initiated under control of the common register processor 106 which results in the application of dial tone to the line circuit of the calling party. This sequence of events is programmed in the common register processor 106 which supplies the control signals, in the proper timed sequence via the junctor relay control 211 and dial tone applicator and out pulser circuit 208 through the service link 111 to the proper relays in the junctor 107 for effecting this operation. The junctor relay control signals are applied from the common register processor 106 to the junctor relay control 211 at input AND gates 400 through 407, as seen in the detailed circuit diagram of FIGURE 4. The input conrtol signals include CO positive and negative (COP and CON) signals, T positive and negative (TP and TN signals), R positive and negative (RP and RN signals), S positive (SP) and MK negative (MKN signals). The manner in which these control signals are utilized to effect actuation of the proper relays in the junctor 107 to perform the desired functions will be described in greater detail hereinafter in connection with the description of the dial tone applicator and outpulser circuit 208.

The AND gates 400 through 407 are enabled by the output signal from AND gate 408 which is controlled by a set signal SET and a signal BF from the programmer in the common register processor 106. The signal BF for enabling the AND gate 408 may also be derived from the output of AND gate 409 as will be described in greater detail hereinafter. The control signals from the register processor 106 are applied through the enabled input AND gates 400 through 407 to respective input flip flops 411 through 418, which are set by application of the control signals thereto. The outputs of flip flops 413 through 418 are applied to AND gates 423 through 428, respectively, which in turn place these control signals on the lines T, R, S, CO, HLD and MK respectively, to the associated dial tone applicator and out pulser circuit 208 to which the junctor relay control circuit is connected.

The enabling of the AND gates 423 through 428 so as to permit the control signals from the common register processor 106 to pass through to dial tone applicator and out pulser circuit is effected under a timed sequence controlled by a binary counter 421 which is started through application of a start signal PL upon coincidence of a timing pulse from a 200 pulse per second source and either of the signals COP or CON applied via respective flipflops 411 and 412 through OR gate 419 to AND gate 420. The timed order of operation provided by the binary counter 421 is necessary to insure that prior to application of control pulses from the junctor relay control through the dial tone applicator and out pulser circuit and service link network to the junctor, the relay CO in the junctor is set either by a control signal COP or CON from the common register processor 106 so that initially the tip T and ring R transmission lines in the junctor to the trunk link network are isolated from the corresponding T and R control lines connected to the service link network, thereby preventing feedback of control impulses from the relays to the transmission line.

Thus, as soon as the control signal COP or CON is applied to its respective AND gate 400 or 401, this control signal is immediately applied to the line CO to the dial tone applicator and out pulser circuit (FIGURE 5A) to set the relay CO in the junctor via the service link network and also, at the same time, is applied through OR gate 419 to AND gate 420, whereupon coincidence with a pulse from the pulse source connected to the AND gate applies the start signal PL to the binary counter 421. The binary counter 421 then begins its binary count until it reaches a count of six (0110) which enables the AND gate 422 applying a start signal to the flipflop 410. With the setting of flipflop 410, the AND gates 423 through 428 are enabled in coincidence with the control signals applied via flipflops 413 through 418 and the control signals are then applied to the appropriate lines to the dial tone applicator and out pulser circuit.

At the same time, the zero output from each of the flip flops 410 through 418 is applied to AND gate 431, which monitors the set condition of each of the flip flops 410 through 418, which signal is represented by an output to AND gates 432 and 430. The AND gate 432 also receives a signal from AND gate 433 connected to the reset or "not" outputs of the binary counter indicating the operating condition of the binary counter. The output of AND gate 432 represented by the signal BF therefore indicates the busy condition of the junctor relay control. This signal BF is utilized during the initial selection of a free junctor relay control to be associated with the dial tone applicator and out pulser circuit as will be described in more detail hereinafter.

The binary counter 421 continues its binary count until it reaches a count of 12 (1100) at which time the AND gate 429 is enabled providing an output signal which resets each of the flip flops 410 through 418. The reset condition of the flip flops is then detected by AND gate 431 providing an output signal to AND gate 430 in coincidence with the output of AND gate 429 which resets the binary counter. This reset condition of the counter in the flip flops is also monitored at AND gate 432 which then indicates the free condition of the junctor relay and enables its use immediately in conjunction with another dial tone applicator and out pulser circuit.

DIAL TONE APPLICATOR AND OUTPULSER

The dial tone applicator and outpulser circuit may be divided into a mechanical portion, as illustrated in FIGURE 5A and an electronic portion as illustrated in FIGURE 5B. The mechanical portion contains the various relays which connect the output control lines from the junctor relay control 211 through the service link network 111 to the junctor 107. In response to control signals applied through the electronic portion of the dial tone applicator and outpulser from the common register processor 106.

Looking to FIGURE 5A, the input control lines T, R, S, CO, HLD, and MK are provided in duplicate for connection to the two respective junctor relay control circuits available to the plurality of dial tone applicator and outpulser circuits in the system. The two sets of input control leads in the mechanical portion of the dial tone applicator and outpulser circuit are suffixed either with a designation (A) or a designation (B) depending upon whether they are connected to the A junctor relay control or the B junctor relay control. The outputs BF from each of the junctor relay controls A and B are applied to the electronic portion of the dial tone applicator and outpulser in FIGURE 5B to respective AND gates 500 and 501.

As indicated above, at the time a dial tone applicator and outpulser circuit and a junctor circuit is elected by the common register processor 106 for processing a given call, the address of the associated junctor is stored in the register memory 207 which is periodically scanned to provide access between the various portions of the memory and the common equipment on a time share basis. When the address of an associated junctor and dial tone applicator and outpulser circuit is detected by a register cell address scanner (not shown) in the common register processor 106, AND gate 502 in the electronic portion of the dial tone applicator, and outpulser circuit (FIGURE 5B) is enabled, thereby applying an enabling signal to the AND gates 500 and 501. If at this time the junctor relay control A is free for connection to the dial tone applicator and outpulser circuit, coincidence will occur at AND gate 500 enabling this AND gate and applying a signal BFA to the register common processing circuit which in turn will apply the signal BF in coincidence with a SET signal to AND gate 408 in the junctor relay control enabling the input AND gates 400 through 407 therein. If, on the other hand, the junctor relay control A is occupied at the time that the associated register cell in the register memory 207 is being scanned, and if the junctor relay control B is free for connection to the dial tone applicator and outpulser circuit, coincidence will occur at AND gate 501 which provides a signal BFB to the register processor so that the input AND gates in the junctor relay control B may be enabled. If both the junctor relay controls A and B are in use at the time of scan of the associated register cell, no connection will be effected between the dial tone applicator and outpulser circuit and a junctor relay control until the next scan of the associated cell when one of the junctor control circuits is available. This process will continue until a junctor relay control is available to the dial tone applicator and outpulser circuit.

Upon connection of a junctor relay control to a dial tone applicator and outpulser circuit and application of an input pulse COP or CON to the junctor relay control sufficient to enable OR gate 419, an output pulse will be applied to the control line HLD from the junctor relay control to the electromechanical portion of the dial tone applicator and outpulser circuit enabling either the relay RCA or the relay RCB, depending upon which of the two junctor relay controls A or B is selected, in coincidence with setting of the associated flip-flops 503 or 504 in the electronic portion of the dial tone applicator and outpulser circuit by the common register processor 106.

The flip-flops 503 and 504 are set by way of AND gates 505 and 506, which are enabled by coincident signals from address AND gate 502, a respective signal RCA or RCB from the register processor 106 and reset signals from flip-flop 510 associated with the dial tone circuit and the flip-flop associated with the other AND gate, either 503 or 504. In this way, the relay RCA, for example, is set only if the junctor relay control A is available, if the signal RCA from the register processor 106 is applied to AND gate 506, if the flip-flop 503 associated with the junctor relay control circuit B is reset, and if no dial tone has been applied to the output control leads from the dial tone applicator and outpulser circuit. The relays RCA and RCB serve to activate one or the other of the two sets of input control leads into the electromechanical portion of the dial tone applicator and outpulser circuit as is evident from FIGURE 5A.

The remaining inputs into the electromechanical portion of the dial tone applicator and outpulser circuit are the dial tone leads DT and DTG connected to a dial tone generator of conventional configuration. The dial tone lead DT is connected to the output control line MKF to the service link network 111 and the junctor 107 upon actuation of the dial tone relay DT in the electromechanical portion of the dial tone applicator and outpulser circuit (FIGURE 5A), which relay is activated in accordance with a timed sequence by the programmer in the common register processor 106 via line DT to AND gate 511. The AND gate 511 is enabled by coincidence of the control signal DT from the processor with the output of AND gate 502 connected to the register cell address scanner in the processor.

A relay RD is provided in the electromechanical portion of the dial tone applicator and outpulser circuit which is energized upon application of control pulse RD from the register processor 106 to AND gate 512 which sets flip-flop 508 upon coincidence with the output signal from AND gate 502 connected to the register cell address scanner. The energization of relay RD serves to place a ground on output control line S through the service link network to the junctor which enables the marking from the junctor back to the line link network. A relay SR is provided in the electromechanical portion of the dial tone applicator and outpulser circuit in series with the control line R and serves to effect a monitoring of the reversal of battery on the called side of the transmission bridge in the junctor under control of the register processor 106. Energization of the relay SR upon application of the proper pulse to the line R from the junctor relay control places a ground on the lead SR to the electronic portion of the dial tone applicator and outpulser (FIGURE 5B) which is applied to AND gate 513, enabled by the output of AND gate 502 connected to the register cell address scanner. The condition of the called side of the transmission line is then applied to the register processor via the AND gate 513 which condition is determined by whether or not the polarity of the called side of the transmission line will energize or not energize the relay SR and therefore apply a ground to AND gate 513. A relay SH is also provided in the electromechanical portion of the dial tone applicator and outpulser, which when energized through application of a control pulse SH through AND gate 514 in coincidence with the output of AND gate 502 to flip-flop 509 serves to shunt the relay SR, preventing operation of this relay and providing a low impedance path for outpulsing.

When it is determined by the number translator 105 after receipt of dialed information from the calling subscribed that an outgoing trunk circuit to other common control equipment must be effected, it is necessary to transfer the dialed information stored in the register memory 207 through the service link network 111 and junctor 107 to this outgoing trunk circuit for storage and further processing in the other common control equipment. This function is carried out by the outpulser section of the dial tone applicator and outpulser circuit. Outpulsing is effected through a relay PL controlled by application of control pulses PL through AND gate 515 to flip-flop 507 in coincidence with the output of AND gate 502 from the register cell address scanner. Energization of the relay PL provides a direct connection 516 between the output control lines T and R in the electromechanical portion of the dial tone applicator and outpulser circuit, thereby providing an outpulsing through the service link network 111 and junctor 107 to the outgoing trunk circuit. This outpulsing is carried on under control of the register processor 106 in accordance with the information stored in the register memory 207.

An AND gate 517 in the electronic portion of the dial tone applicator and outpulser circuit (FIGURE 5B) is connected to the register processor 106 and is energized by detection therein of the address of the preceding register cell stored in the register memory 207 to the cell which is associated with the particular dial tone applicator and outpulser circuit, and this AND gate 517 serves to reset the flip-flops 503, 504, 507, 508, 509, and 510, thereby insuring that no incorrect information is stored in the flip-flop just prior to scanning of the register cell in the register memory 207 which contains information for the dial tone applicator and outpulser circuit. Upon scanning of the appropriate cell in the memory, the electronic portion of the dial tone applicator and outpulser circuit is ready for receipt of information.

A relay BY in the electromechanical portion of the dial tone applicator and outpulser circuit is provided as part of the general alarm circuit providing monitoring of the condition of the various relays in the system and prevents use of the equipment upon detection of an improper condition of any of the relays PL, RD, SN and D7 which are of the latching type in the electromechanical portion of the circuit. If at a time of inactivity of the circuit any of the relays remain operated, the relay BY will be energized applying a signal ALM through AND gate 518 in coincidence with the output of AND gate 502 from the register cell address scanner to the register processor 106, when the circuit is first scanned by a register, thereby preventing the application of control information and instruction to this circuit.

In order to provide a clearer understanding of the functions of the junctor relay control and dial tone applicator and outpulser circuit the following description of the operation of these circuits from detection of an open line circuit of a calling subscriber to the application of dial tones to this line circuit will now be set forth.

At the time a call is originated, the open line resulting from an off-hook condition is detected by the line scanner 103 which signals this condition to the line link network control 104. The line link network control scans the junctors and the dial tone applicator and outpulser circuits to find an available one of each as determined by the condition of the MK circuit in both the junctor and the dial tone applicator and outpulser circuits. When a free dial tone applicator and junctor are selected, the address of the junctor is stored in the dial tone applicator and outpulser portion of the register memory 207, which has a portion or cell allocated for each dial tone applicator and outpulser circuit for which it is available.

The programmer in the common register processor 106 then initiates a timed sequence of events which eventually results in the application of dial tone back through the dial tone applicator and outpulser circuit, the service link network 111, the junctor 107, and the line link network 102 to the calling line circuit 101. This sequence of events begins by application of a control signal RD through the AND gate 512 in coincidence with the output of AND gate 502 from the register cell address scanner to set flip-flop 508 in the dial tone applicator and outpulser circuit, (FIGURE 5B). Upon setting of the flip-flop 508, the relay RD in the electromechanical portion of the dial tone applicator and outpulser circuit is energized and places ground on control line S through the service link network to the junctor 107 where it is applied to the transmission line S back to the line link network establishing connection between the line link network and the junctor in accordance with a typical marking operation through a finder sequence. However, since the relay RD in the junctor is not as yet operated, the change in condition of the calling line due to the off-hook condition cannot as yet be detected by the sensors in the junctor.

At this point, it is necessary to operate the relay CO in the junctor to connect the output control leads from the junctor to the junctor relays and isolate the transmissions lines on the called side of the transmission bridge in the junctor from the junctor relay control circuit and the dial tone applicator and outpulser circuit for the following sequence of operations. This is effected through application of negative signal CON from the programmer in the register processor 106 to AND gate 401 and the junctor relay control, which, as indicated above, sets flip-flop 412 providing the proper output control signal to the line CO in the junctor relay control from which it is applied through the line CO in the dial tone applicator and outpulser circuit (FIGURE 5A) through the service link network 111 to the control line CO in the junctor 107 to set the relay CO.

At the same time, the setting of the flip-flop 412 enables OR gate 419 in the junctor relay control which subsequently enables AND gate 420 upon coincidence of the next pulse from the 200 pulse per second pulse source to start the binary counter 421. When a count of binary 6 is reached by the binary counter AND gate 422 is enabled setting flip-flop 410 which enables each of the AND gates 423 through 428 in the junctor relay control providing application of the control signals applied to the input AND gates 402 through 407 from the common register processor 106 through the dial tone applicator and outpulser circuit and the service link network 111 to the junctor 107. During this period when the AND gates 423 through 428 are enabled in the junctor relay control a control signal is applied to each of the output control lines T, R, S, CO and MK through the dial tone applicator and outpulser circuit to the junctor 107 to ensure that the relays in the junctors are set properly for the following operation. Under control of the common register processor 106 a positive signal is applied through AND gate 402, flip-flop 413 and AND gate 423 to line T in the junctor actuating relay RD thereby connecting the calling bridge CB to the transmission lines T and R from the line link network. Negative signals are applied to the output control lines R and MK of the junctor relay control to the corresponding lines in the junctor to relays TK and SR to ensure that these relays remain in the reset condition. Actuation of the relay RD in the junctor in addition to connecting the calling bridge CB to the line link network also places a ground on the transmission line S to the line link network so that the ground applied to this transmission line from the dial tone applicator and outpulser circuit through energization of the relay RD therein can be removed at the end of the scan of the address cell in the register memory 207 without disconnection of the junctor from the line link network.

Under control of the common register processor 106 in accordance with the timed sequence the signals on line T, R and MK in the junctor are first removed and then the output signal on lead CO in the junctor is removed to deactivate the relay CO. Since the relays RD, TK, and SR are latching relays, the previous condition of the relays will be maintained even after the signals are removed; however, since the relay CO is a polar relay, this relay is deactivated by removal of its control signal.

The program in the register processor 106 then provides for application of control signal DT to the dial tone applicator and outpulser to enable AND gate 511 and set flip-flop 510 thereby energizing the relay DT in the circuit. As soon as the relay DT is energized the dial tone generator is connected via the line DT to the output control line MKF from the dial tone applicator and outpulser circuit connecting the dial tone generator to line MK in the junctor which, due to the condition of relays CO and TK, is connected to the winding 330 of the main transmission bridge 301 in the junctor inducing dial tone in the calling side of the bridge to be applied back through the line link network to the line circuit of the calling party.

With dial tone now applied through the junction to the calling party and with the condition of the calling line being monitored by the sensors in the junctor, which are connected to the supervisory processing circuit 201, further control of the call is vested in the supervisory processing circuit under command from the common register processor 106.

SUPERVISORY PROCESSING CIRCUIT

FIGURE 6A shows a general arrangement of the supervisory processing circuit 201 which is time divided over a number of junctors so as to provide control for a plurality of calls at a given time. The time division is accomplished by a scanner circuit 202 which pulses into the calling and called sensors of each junctor in turn, which sensors are provided in conjunction with a saturated inductor so that whenever the calling or called loop is open an inductive coupling exists between the windings of the sensor and hence, an output pulse occurs. When, however, current flows in either the calling or called loops then the transformer is saturated and no coupling exists so that there is no output pulse derived therefrom. In this way, it is possible to build up a logic pattern of open and closed states on the sensor and thus detect impulses derived from the calling line. Since the scanner examines each junctor at regular intervals, it is possible to relate the state of the loop and the time of scanning with the record of the previous state of the loop, maintained in the junctor memory 203, which is available at each examination of the condition of the line to which the junctor is connected. This detection of line condition change plus existing line condition serves as means for initiating control functions via the common register processor 106.

Referring now to FIGURE 6A, there is provided a schematic diagram of the switching arrangement between the supervisory processing circuit 201, the junctor memory 203, and the plurality of junctors 107 associated with these elements by means of the electronic scanner 202. The scanner 202 may comprise a chain counter or any other well known device for sequentially pulsing the interrogate windings in both the calling and called bridges of each of the junctors 107. This sequential scanning of the interrogate windings in the junctors 107, which may be carried out through use of a conventional scanner matrix in conjunction with a series counter arrangement, is effected in synchronism with a sweeping of the junctor memory 203 so that as each given cell associated with a given junctor is acquired in the junctor memory 203 a coordinate acquisition and connection of the junctor to the supervisory processing circuit 201 is effected under control of the electronic scanner 202. The scanner is operated under control of a suitable clock signal and reset signal which are applied to the supervisory processing circuit 201 to effect coordinate control thereof. As will be indicated in greater detail hereinafter, the supervisory processing circuit 201 accepts information from the individual junctors scanned by the electrode scanner 202 and compares this information with the information in the junctor memory as to the previous condition of the line circuits connected to the junctor and this information along with data from the common register processors is used to update the junctor memory and also effect control of the various common circuits either through the service link network control 110 and service link network 111 or through the register buffer 205 and register control 206.

Referring now to FIGURE 6B, which shows a schematic diagram of the supervisory processing circuit 201 with only one pair of called and calling sensors illustrated in the diagram so as to avoid the complication caused by illustration of duplicate equipment, it should be understood from the above mentioned description of FIG. 2 that the sensors in the junctor are sequentially connected to the supervisory processing equipment so that at any given time only one pair of sensors from a single junctor will be connected to the circuit. FIGURE 6B schematically illustrates such a condition.

The read out windings 600 of the calling sensor and the read out winding 601 of the called sensor are connected respectively to flip-flops 602 and 603, which devices are set by application of a pulse from the read out winding, but remain in the reset condition if due to the saturation of the core in the calling or called bridge no pulse is provided by the read out winding upon interrogation of the calling and called sensors. Thus, the set or reset condition of the flip-flop 602 and 603 determine the condition or state of the calling and called line circuits, respectively. The clock pulses applied to the electronic scanner 202 serve to interrogate the sensors in each junctor once every ten milliseconds so that a dialed impulse which is 20 milliseconds in length will be sensed at least twice during its duration by the supervisory processing circuit thereby insuring that the loop is closed or opened for a definite period of time before the condition is recognized as a distinct signal and not a bouncing contact.

The supervisory processing circuit includes a series of twenty-five AND gates 604 through 629 which individually receive a respective one of the twenty-five bits of information stored in the junctor memory 203 associated with the particular junctor which at the that time is being scanned and apply these bits of information to a series of flip flops 630 through 655 upon coincidence at the AND gates 604–629 of a timing pulse from READ flip flop 656. The bits if information stored in the information 630–655 are applied to a data control network 660 which consists of an AND gate arrangement for combining the information provided in the junctor memory 203 with the updated information provided by the sensors in the junctor and data provided from the register processor 106. For example, during examination of the sensors in a given junctor the twenty-five bits of data in the junctor memory associated with this junctor are applied to the data control network 660 via the AND gates 604–629 and flip-flop 630–655. At the same time, any change in data present in the junctor memory and available through the register processor is also applied to the data control network. The AND gate arrangement in the data control network then provides a logical comparison between the previously stored data and the updated information provided from the junctor and the register processor and rewrites this information to provide a more correct representation of present conditions in the system.

Referring temporarily once again to FIGURES 2B, the information in the character A, bits 3 and 4 representing the condition of the calling and called line circuits, respectively, from the memory would be compared with the data stored in flip flop 602 and 603 and detected changes in this condition would then be written into the memory at these locations by suitable AND gates. In addition, information for example in character A, bits 1 and 2, providing for a condition of the system, and data for example in characters C, D and E which represent subscriber information provided by the translator via the processor, and also represent conditions in the system, would be supplied by the register processor to the data control network where it is compared with the data already written into the junctor memory so that a logical ANDing of the data will provide an updating of the information in the junctor memory. In character B, bits 1, 2 and 3 represent a counting sequence provided by the register processor so that during each scan the progress of the counter is applied to the data control network where it is then written into the junctor memory. The result of the logical ANDing of the information provided from the junctor and the register processor with the data supplied from the junctor memory is applied through suitable outputs through AND gates 661–685 back to the junctor memory. The AND gate 661–685 are enabled by an output from WRITE flip flop 686 which is set as soon as all of the information applied to the data control network 660 has been processed by that network.

Due to the complexity of the logical arrangement of the AND gates and the data control network resulting necessarily from the combination of a multiple of twenty-five AND gates for insuring correct processing of the applied information, a detailed illustration of the data control network has not been provided. However, it should be sufficient for an understanding of this invention that the data control network 660 provides for a logical combination of the individual bits of information stored in the junctor memory with updated bits of similar information provided by the junctor and the register processor so as to correct or revise the information in the memory during each scan thereof.

Since certain data appearing in the junctor memory in addition to the data indicating the condition of the calling loops serve as means for initiating operation of various circuits in the system, the data resulting from the logical combination of information from the junctor, the register processor 106 and previously stored information in the memory is not only written back into the memory, but appropriate bits of information are also transferred via the register buffer 205 to the register control 206 in the register processor 106. The register control 206 stores this information in the register memory 207 and also utilizes this information to control the various common circuits required for a particular function. This output data is also applied from the data control network 660 directly through the service link network control 110 to the service link network 111 where it may act directly upon certain of the common circuits associated therewith.

Looking once again to the operation of the system in conjunction with the supervisory processing circuit, with dial tone having been applied from the dial tone applicator and outpulser circuit 208 under control of the register control 206 through the service link network 111, junctor 107 and line link network 102 to the line circuit 101, any change in the condition of the calling line circuit will be detected by the supervisory processing circuit, which scans the calling sensor in the junctor connected to the line circuit every ten milliseconds. When the calling party begins dialing, the change in condition of the line circuit from open to closed is detected and stored in the junctor memory during the next scan of the junctor. In addition, the change in condition of the line circuit causes a change in the condition of the character A, bit 1, of the junctor memory from a zero to a one to indicate the present use of this memory cell. The condition is also applied to the register processor 106 which starts the sequence counter therein provided for timing the intervals between detected pulses in the line circuit.

During each successive scan of the junctor memory at five millisecond intervals, the bits 1, 2 and 3 in character B of the memory are stepped by the counter in the register processor 106 to provide a count of the time interval subsequent to the receipt of the change of line condition. This timing is continued until it is determined whether the change in line condition is the result of a dialing impulse or whether or not the calling subscriber has hung up, as indicated by the expiration of a predetermined period of time resulting in a predetermined count in the memory. In case of the latter situation, the connection to the line circuit is terminated unless a particular class of service prevents this, and the time share equipment is disassociated from the junctor and supervisory processing circuit.

In the case of a dialing condition a dialing pulse indicated by an open circuit will be detected in the supervisory processing circuit which writes the information into the memory during the next scan and the counter in the common register processor 106 is reset and begins its count once again, the count being inserted during each scan into character B in the junctor memory. As indicated previously, at least two scans of the junctor sensors occur during each dialing impulse so as to insure that the change of line condition is a dialing impulse rather than a bouncing contact.

After the dialing impulse has been detected twice in the supervisory processing circuit, bit 1 of the character D of the junctor memory is changed from a zero to a one indicating that the register buffer 205 should be requested. This instruction stored in the memory is also applied to the register buffer and the instruction in character D of the memory is repeated until the buffer which is provided on a time share basis is available for association with the supervisory processing circuit. After the buffer is seized and during the next cycle, the dialing impulse is transferred to the buffer where it will be shifted to register control 206 and register memory 207. As a result of receipt of a dialing impulse, which has now been transferred to the register control 206, it is necessary to remove dial tone from the line circuit of the calling party, which function is performed by the dial tone applicator and out pulser circuit under control of the common register processor 106. At the same time, the counter in the junctor memory continues its count to determine the interpulse interval.

The supervisory processing circuit may next detect a closed condition in the junctor sensor indicating a dialing impulse, which again is stored in the register memory and serves to reset the counter in the memory to measure the interpulse interval. This counting subsequent to the detection of a dialing impulse will continue either until a next impulse is detected or until a 40 millisecond time period has expired as indicated by a control signal from the register processor 106. When the 40 millisecond pulse is received from the processor an end of digit sequence is initiated.

If additional dialing impulses are received from the supervisory processing circuit from the junctor 107, in each case the impulse detected is stored in the junctor memory and applied through the register buffer 205 to the register control 206 and register memory 207 along with resetting of the counter and the junctor memory to determine the interpulse interval. When the last impulse of a digit has been received, the counter in the junctor memory will continue its count until the first forty millisecond pulse is received from the register processor 106, the counter having reached a binary count of 100 at this time, the counter is then stopped and retains its binary count until the next 40 millisecond pulse is received from the register processor 106 at which time the counter shifts to binary 101. The counter retains its binary count until a third 40 millisecond pulse is received from the register processor which then shifts the counter to a binary 111 indicating an end of digit condition.

During the next scan, the buffer is requested by the supervisory processing circuit, and when received, the end of digit signal previously inserted into the junctor memory, upon receipt of the third 40 millisecond timing pulse, is transferred through the buffer to the register control memory indicating that a complete digit has now been stored in the register memory. As soon as information is received in the register processor to indicate that the first digit has been dialed and stored in the register memory, reference is made to the number translator 105. If the destinaton of the call can be determined at this time from the digit which has been received, the translator supplies this informaton to the register control 206 which then takes further action to complete the call.

However, if the destination of the call or other required information cannot be supplied at this time, then the register control refers to the translator 105 again after the second digit has been received and repeats this procedure after each digit received until information as to the destination of the call, whether it be a local call or an outgoing call is provided by the number translator. If the call is finally determined to be local, then the register marks the called line circuit through the line link network control and by a conventional marking operation the junctor 107 is connected through the line link network to the called party. As will be indicated in greater detail hereinafter, ringing is then applied to the called line loop provided the line is not busy at the time of connection thereto, and ringing to the called line circuit with the ringback to the calling line circuit is maintained until the called party answers, as indicated by a reversal of battery in the called line loop, or the calling party hangs up, as indicated by a change in the condition of the calling line loop.

In view of the asynchronous relationship between the operation of the supervisory processing circuit and associated junctor and junctor memory and the common register processor, it is necessary to provide a means for storing information transferred from the supervisory processing circuit into the register control 206 to compensate for the difference in timing between these two systems. This function is carried out by the register buffer 205.

REGISTER BUFFER

At the time the register buffer is acquired by the supervisory processing circuit the address of the junctor associated with the supervisory processing circuit at that time is inserted into the buffer by way of line 701–708 (FIG. 7A) and is stored in address flip flops 710 through 717. The four flip flops 710–713 store the X portion of the junctor address while the four flip flops 714–717 store the Y portion of the junctor address. The information to be transferred from the supervisory processing circuit to the register control 206 and register memory 207 is also applied from the supervisory processing circuit via lines 718–721 (FIG. 7B to instruct storage flip flops 725–728, which flip flops are either set or remain in the reset condition depending on the binary condition of the information applied thereto.

As soon as an address is stored in the flip flops 710–717, in the register buffer, the set condition of one or more of the address flip flops is detected by a series of OR gates 730–737 which are connected to respective ones of the address input lines 701–708. A set condition of any one of the address flip flops 710–717 will result in application of a control signal via the associated OR gate 730–737 to a buffer busy store flip flop 740 which is set by the application of such a signal. The output of the buffer busy store flip flop 740 is applied to the supervisory processing circuit as an indication that the buffer is ready for transfer of the instruction from the supervisory processing circuit to the flip flops 725–728 in the buffer instruction section. An output signal from the busy store flip flop 740 also indicates the busy condition of the buffer to the supervisory processing circuit until the information in the buffer is transferred to the register control 206 and the buffer is cleared.

With the address of the junctor associated with the information to be transferred, stored in the flip flops 710–717 and the information or instruction stored in the flip flops 725–728, the buffer waits until the cell or segment assigned to the particular junctor associated with the stored information is accessible so that transfer of the stored information in the buffer can be effected into the proper time slot in the register memory 207. As the information stored in the register memory 207 circulates, and as each cell in the register memory 207 becomes accessible, the register control 206 applies the address of the junctor associated with the cell to the register buffer 205 where it is applied via input address gates 741–748 and 749–756. The inputs 741–748 provide for the X portion of the address, including both set and reset signals for each character, and the input lines 749–756 provide the Y portion of the address and also include both the set and reset signals for each character of the address.

The X and Y address applied from the register control to the register buffer is then compared with the X and Y address of the junctor associated with the information stored in the buffer to determine whether information is provided in the buffer for the time slot presently accessible in the register memory 207. When the address provided by the register control 206 and the supervisory processing circuit 201 coincide in the register buffer 205, then the information stored in the register buffer can be transferred to the register control 206. The comparison between the two addresses is effected by a series of AND and OR gates formed in combinations such as provided by AND gates 760 and 761 and OR gates 762.

The AND gate 760 of each identical group is connected to the "set" side of the first character of the address provided both by the register control 206, the "reset" signal of the first character provided by the register control 206 and the reset side of flip flop 710. Thus, if a "one" is received as the first character of the address from both the register control and the flip flop 710, the AND gate 760 will be enabled applying a signal through OR gate 762 to an AND gate 763 which combines output signals for each of the four characters of the X portion of the address. On the other hand, if the first character of the X address as provided by both the regiser control and the flip flop 710 is a 0, the AND gate 761 will be enabled applying control signal through OR gate 762 to the AND gate 763.

In the same manner, if coincidence occurs between the X address provided by the register control 206 and that stored in the flip flop 710–713 and coincidence also occurs between the Y address from the register control 206 and the address stored in flip flop 714–717 both AND gates 763 and 764 will be enabled thereby enabling AND gate 765 to which each is connected so as to provide a transfer control signal in the output of this AND gaate 765. This transfer control signal is utilized to transfer the information stored in the instruction portion of the buffer in flip flop 725–728 to the register control 206 and register memory 207, in a manner to be described more fully below.

If there is lack of coincidence between the address provided by the register control 206 and that stored in the flip flop 710–717, for example, if the initial character of the X address provided by the register control is a "one" and the initial character stored in flip flop 710 is a "zero" neither AND gate 760 nor 761 will be enabled so that no control output will be applied through OR gate 762 to the AND gate 763. Under these circumstances, the AND gate 763 and will not be enabled thereby preventing enabling of the AND gate 765 so that no transfer control signal can be generated under these circumstances. Exact correspondence between the address provided from the register memory and that provided from the supervisory processing circuit to the register buffer must be obtained before a transfer of information from the buffer to the register control 206 will be possible.

The information stored in flip flop 725–728 (FIG. 7B) is applied to a series of AND gates 770–777 which store both the set and reset values provided by the flip flop 725–728. The AND gates 770–777 provide outputs of the information stored in the instruction flip flops to the register control 206 which applies the information to the register memory for storage. The gates 770–777 are simultaneously enabled by the transfer control signal derived from the AND gate 765 (FIGURE 7A) indicating that exact correspondence between the address of the junctor and the address of the available register cell in the register memory 207 has occurred.

As soon as the information is received in the register control 206, an "information stored" signal is returned to the buffer by the register control via line 780 (FIG. 7A) which resets all of the flip flops 710 through 717 and 725–728 and also resets the buffer busy store flip flop 740 to indicate the free condition of the buffer. The buffer is then available immediately for another call. Subsequent to release of the buffer, the register control transfers the information received therefrom into the memory segment of the register memory where the information is implemented. As each digit of the dialed number is detected in the sensors in the junctor 107 and applied via the supervisory processing circuit 201 and register buffer 205 to the register control 206, where it is stored in the register memory 207, the number translator 105 is consulted to determine whether this digit or the full group of received digits are sufficient to indicate further activity of the system or to determine whether the call is local or requires an outgoing trunk. Upon receipt of the third digit in the register memory the number translator is able to determine whether or not the call is local and, if so, the register control awaits the receipt of the four additional digits identifying the called party until further action is taken for completion of the call.

At the time all of the digits have been received in the register memory, and the register has determined from the number translator 105 that the call is a local call, the register control 206 once more acquires the dial tone applicator and outpulser circuit 208 associated with the junctor connected to the calling party for purposes of initiating the marking from the junctor through to the called party. As soon as the number translator has received all of the digits and is capable of determining the line circuit of the called party, the line link network control 104 is actuated by the number translator to mark the line circuit of the called party, and at the same time the register control 206 performs a series of operations which serve to place a mark on the called side of the transmission bridge in the junctor so that a connection may be established between the junctor and the called party through familiar marking operations. This marking of the junctor is carried out by the register control 206 through the dial tone applicator and outpulser circuit 207 and service link network 111. As in the case of the dial tone sequence, operation of the junctor relay control 211, FIGURE 4, is initiated by application of a negative pulse CON thereto from the register control 206. This initiates operation of the binary counter 521 and applies a negative pulse through the dial tone applicator 207 and service link network 111 to set the CO relay in the junctor.

The setting of the CO relay provides for isolation of the outgoing transmission lines from the junctor and the junctor control lines connected through the service link network to the dial tone applicator-outpulser circuit. Each of the lines T, R, S and MK in the junctor circuit are energized by way of control from the register control 206 to the dial tone applicator and junctor relay control to insure proper operation of the relays connected thereto, and also to provide a positive pulse to control line R in the junctor so as to effect operation of the TK relay, which as indicated above, removes DC from the called side of the transmission bridge 301 in the junctor, thereby extending the dry loop to the trunk link network 108 and back to the line link network 102 for purposes of marking the called side of the junctor.

At the same time that relay TK in the junctor is operated, a positive pulse is supplied to control line T and a negative pulse to control line MK in the junctor to insure that the relays associated therewith are properly responsive. The relay CO in the junctor is then released under control of the register control 206 and the marking operation begins by application of a negative pulse to the control line MK in the junctor which in view of the release of the relay CO and the locked condition of the relay TK is applied to the transmission line MK to the trunk link network. A conventional marking operation then is purused until the path between the junctor and the called line circuit is complete. At the time that the junctor is connected to the line circuit of the called party the dial tone applicator and outpulser circuit 208 is released by the register control 206.

Having acquired the line circuit of the called party, it is now necessary to provide ringing to the called party and ring back to the calling party to complete the call. This ringing is provided by a ring control circuit 210 (FIG. 2A) by the service link network 111 and junctor 107 under control of the register control 206.

RINGING CONTROL

The ringing control circuit consists of an electronic portion shown in FIG. 8 which is connected via the service link network 111 and service link network control 110 to the supervisory processing circuit 201 which provides the junctor address thereto during acquisition of the circuit. The ringing control circuit is additional connected via the service link network control 110 to the register control 206 which derives from the number translator 105 the proper ringing code of the called party and applies this ringing code along with an initiating control signal which are applied by the electronic portion in FIG. 8 to the electromechanical portion shown in FIGURES 9A and 9B and 9D. The electronic portion also contains a busy store which indicates the busy condition of the ringing control, which busy store is provided in such a way that it may be overridden under proper conditions, such as to remove the ringing condition when the call is abandoned by the calling party prior to answer by the called party. The electromechanical portions shown in FIGURES 9A, 9B and 9D include connection to a plurality of ringing generators so that multi-party ringing may be applied to the called line in a sequence of operation which is controlled by a counter which pulses at a controlled speed to apply the proper control conditions.

Referring more particularly to the electronic portions of the ringing control shown in FIG. 8, a plurality of flip flops 800–803 and 804–807 are provided for storing in the X address and Y address, respectively, of the junctor upon acquisition of the ringing control by the supervisory processing circuit 201. The X and Y address of the associated junctor is applied to the flip flops 800–807 setting selective ones of the flip flops and leaving the remaining ones reset in accordance with the junctor address. The impulses included in the junctor address are also applied via OR gates 810–817 to AND gate 818 which is enabled upon receipt of at least one impulse from both the X portion and the Y portion of the junctor address. The enabling of AND gate 818 provides for a setting of busy store flip flop 820 which then provides an output indicating that the ringing control has been acquired in connection with a particular junctor.

Both the set and reset sides of each of the flip flops 800–807 are applied to individual AND gates 821–836 along with corresponding address portions applied thereto from the register control 206 via service link network control 110 and service link network 111. Upon coincidence of the address provided by the junctor in flip flops 800–807 and the address provided from the register control 206 and AND gates 821–836, appropriate signals applied via respective OR gates 837–844 to coincidence AND gates 845 and 846 will enable the coincidence AND gates and applied output signals to control AND gates 847 and 848.

The control AND gate 847 not only receives an enabling impulse from coincidence AND gates 845 and 846 but also receives the initiating control signal CN set from the register control 206, which sets control flip flop 850 providing a control output CN to the electromechanical portion of the ringing control in FIGURE 9A. The control AND gate 848 receives control signals from coincidence flip flops 845 and 846 and also receives a control signal CN reset from the register control 206 which enables the AND gate 848 and serves to reset the control flip flop 850. An additional control signal is applied from the register control 206 to the electronic portion of the ringing control to the reset side of the busy store flip flop 820 for resetting this flip flop and also is applied to the flip flops 800–807 to erase the address stored therein at the time of the release of the ringing control from the junctor.

The electromechanical portions of the ringing control is illustrated in FIGS. 9A, 9B, and 9D. In order to provide for multi-party ringing a plurality of ringing generators are associated with the ringing control circuit and a particular ringing code is provided to effect the various ring combinations. The ringing code for a particular called party as determined by the number translator 105 is applied to the ringing control at relays RC1, RC2 and RC4 in FIGURE 9A. As these relays are actuated in various combinations, various ones of the ring generators can be selected for application to the ringing control line R. In addition, a relay RV is provided in association with the ringing control relays RC, which delay RV serves to reverse the polarity of the control lines T and R to the junctor thereby providing an inverse of the ringing codes provided by the relays RC so as to make available an increased number of combinations for multi-party ringing.

An additional relay NC in FIGURE 9A is provided as a means for indicating a "no charge" call, such as calls to the telephone company and other similar free calls along with calls which are terminated prior to answering by the called party. A relay NT is also included which provides for the control necessary in the case that a call is terminated prior to completion. Each of the relays MT, NC, RV and the three RC relays are controlled by impulses provided by the register control 206 via the service link network control 110 and service link network 111. The ringing control code is determined by the register control 206 from the number translator 105 as is the "no charge" condition which initiates the relay NC. The relay NT is controlled upon receipt in the register control 206 of indication from the supervisory processing circuit that the calling line has been open prior to completion of the call.

The control relay CN for the ringing control circuit is also illustrated in FIG. 9A, the energizing signal for this relay being derived from the electronic portion of the ringing control circuit illustrated in FIG. 8. Energization of the relay CN initiates the sequence of events required for applied ringing to the called party and ring back to the calling party.

FIG. 9B shows the portion of the ringing control circuit which is associated with the ringing interrupters and the ringing and tone generators and the manner in which the various ringing generators are controlled to provide the proper ringing to the line circuit of the called party in accordance with the ringing code of this party. It is seen from the figure that the ringing control circuit is provided with five ringing generators and a ring-back tone generator, with one ring generator being selected under control of the relays RC1, RC2, and RC4 for application to the ringing control line R and the ring-back tone generator being applied under control of the ringing interrupter to the control line MK.

In the specific embodiment illustrated the ringing code has been set up such that ringing generator 1 is selected upon actuation or enegrization of the relay RC1, ring generator 2 is selected upon energization of the relay RC2, ring generator 3 is selected upon energization of both of the relays RC1 and RC2, ring generator 4 is selected upon energization of the relay RC4, and ringing generator 5 is selected upon energization of both of the relays RC1 and RC4. However, the actual connection of the selected ring generator to the control line R to the junctor is controlled by the operation of relays INT under control of a conventional ringing interrupter.

In connecting a called line to a ringing control system, it is very advantageous and desirable to effect the initial connection at such a time that at least one third of the normal ringing interval will be applied to the line thereby avoiding the single cycle ring or other short ring condition which is not only annoying but serves also as a delay of the actual ringing of the line circuit. Therefore, in accordance with the instant invention, a pair of relays PU1 and PU2 are also connected to the ringing interrupter and in accordance with the pattern of energization of these relays, the interrupter relay INT is controlled so as to insure that the ringing network will be connected to the link circuit of the called party for at least 1.3 of the initial ringing interval.

Looking to FIGURE 9C, there is illustrated a series of impulses PU1, PU2 and PU3 derived from the ringing interrupter, which consecutive pulses are applied in the manner illustrated in FIGURE 9B to the relays PV1 and PV2 which control the interconnection of the interrupter relay INT to the output terminals of the interrupter in such a way as to control the initial stages of the ringing. In FIGURE 9C, the interrupter impulses INT1, INT2, and INT3 are shown in proper time association with the impulses PU1–PU3 illustrating the staggered time relationship between these impulses. In essence the relays PU1 and PU2 control the application of the interrupter impulses to the interrupter relay INT in such a way that INT1 will be applied to the relay only upon energization of relay PU1, impulse INT2 will be applied to the relay only during energization of the PU2 relay, and impulse INT3 will be applied to the relay only upon energization of both of the relays PU1 and PU2 under control of the impulse PU3. Thus, looking to FIGURE 9C if the line circuit of the called party is connected to the ringing control at time *t*1 during which the impulse PU1 energizes the PU1 relay, the relay INT will be energized by the impulse INT1 applied from the ringing interrupter and since the relays PU1 and PU2 are polar relays provided with a holding circuit the line circuit of the called party will be energized during each interval INT1. It is seen from FIG. 9C that at the time *t*1 at least ⅓ of the interval INT1 is initially taken advantage of.

However, if connection between the ringing control circuit and the called line circuit is effected at time *t*2 in in FIGURE 9C, at which time the relay PV2 is energized and impulse INT1 is applied by the ringing interrupter, no path will be available for the impulse INT1 to the relay INT so no ringing will be applied by the ringing control circuit. However, as soon as the ringing interrupter switches to impulse INT2 a path is open to the relay INT thereby applying ringing tone to the line circuit of the called party. It is seen in this example that rather than apply a ringing interval of ⅓ or less initially to the line circuit so as to provide an extremely short ring and then a delay of three ringing intervals until the next ringing impulse, the system delays but a third of a ringing impulse and then provides a full pulse to the line circuit. The increased efficiency of this arrangement is certainly apparent. The holding circuit for the relay PU1 and PU2 is provided by a line 900 to the control portion of the electromechanical ringing control system illustrated in FIGURE 9D. This holding arrangement will be described in greater detail in connection with the operation of the system in the description of FIGURE 9D.

Looking to FIGURE 9D this control portion of the ringing control circuit provides a pair of control relays: RT connected to the ringing control line R to the junctor, and SL connected to the control line S to the junctor. This portion of the system additionally includes a sequence counter including relays PA, PB, and PC controlled by a timing relay PL. The relay RT serves to disconnect the ringing from the called line circuit upon detection of an "off hook" condition and RT also initiates actuation of the sequence counter to perform the necessary functions to connect the called line to the calling line, via the junctor 107 and supervisory processing circuit 201. Energizaiton of the lead MT (FIGURE 9A) effects energization of the relay RT under forced release conditions and immediately disconnects the ringing from the control lines TR.

In operation of the electromechanical portion of the ringing control circuit, the application of control signal CN to the relay CN in FIGURE 9A sets the relay thereby enabling the relay SL (FIGURE 9D) which applies ground to the control line S to the junctor. This marking from the ringing control circuit to the junctor provides for connection of the ringing control circuit through the service link network to the junctor 107. With energization of the SL relay, ground is applied back through line 901 to line 900 in FIGURE 9B which serves as a holding ground for each of the relays PU1 and PU2 in the ringing interrupter circuit.

The energization of the CN relay also provides for application of negative potential via lines 902 and 903 to each of the relays MT, NC RV and each of the ringing control relays RC so that one or more of these relays may be energized upon application of a proper marking ground to the relay from the register control 206. The ground which is made available by energization of the relay SL is also available to these relays in the ringing control circuit shown in FIGURE 9A via 900 and serves in this circuit also as a holding arrangement for the relays. With the proper ringing control relays energized and the ringing interrupter relay PU1, PU2 and INT energized by the ringing interrupter, ringing is applied via lines 904 and 905 from the appropriate ringing generator to the tip T and ring R control leads to the junctor. At the same time, energization of the INT relay applies the output of the ring-back tone generator to the control line MK to the junctor where the ring-back tone is applied to the center winding 330 on the transmission bridge 301 in the junctor thereby effecting an induced ring-back to the line circuit of the calling party.

The relay PU1, PU2, and RV also provide for control of the ringing via the control lines TR such that these control lines are not opened to the ringing generator until the proper relays have been actuated. In the case of the relay RV which effects to these control lines are provided for this purpose. As soon as connection is made between the ringing control circuit and the junctor through energization of the relay SL, a negative pulse is applied from the ringing control circuit via the lines 907 and the control line CO to the junctor to set the CO relay in the junctor thereby connecting the junctor control lines to the ringing control circuit control lines.

SL also closed the line from the input CN to a relay CNS energizing this relay so as to apply a positive pulse via resistor 909 and 910 to the output control line T of the ringing control and a negative pulse via resistor 911 and 919 to the control line R of the ringing control. The negative potential on control line R applied to the junctor serves to release the RT relay in the junctor which was previously operated during the marking operation.

At the same time, a negative pulse is applied to line MK to the junctor via resistor 913 in line 914, which negative pulse insures the proper condition of the relay SR of the junctor. Next the control signal CN from the register control 206 is removed from the ringing control so that relay CN and relay CNA are released, thereby releasing the relay CO in the junctor. As soon as the relay CO in the junctor is released, the control lines TR and MK are connected from the ringing control circuit through the service link network 111 and junctor 107 to the trunk line network 108 and line link network 102 for applying ringing to the line circuit of the called party and ringback tone to the line circuit of the calling party.

When the called party removes the receiver creating a closed line condition detected in the junctor by the supervisory processing circuit 201, the condition is signalled through the buffer 205 to the register control 206 which applies a release junctor impulse to the ringing control circuit at relay RT which is energized by this impulse and immediately disconnects the lines T and R from the junctor to disconnect ringing therefrom. At the same time, lines 915 and 916 are opened by energization of the relay RT to the ground provided by the relay SL, on the one hand, providing a holding circuit from the relay RT and on the other hand activating the sequence counter made up of relays PA, PB and PC.

The application of ground via line 916 to the relay PA energizes this relay and opens up line 917 to 918. The line 918 which is controlled by the timing relay PL is opened by energization of the relay PL upon application of ground via line 916 so that a holding circuit for the relay PA is provided via lines 917, line 918 and line 919 to line 916. As soon as the relay PL is energized, the connection between the relay and the line 919 is closed, but the relay remains open for a sufficiently long time due to capacitor 920 to provide for holding of the relay PA and application of ground via lines 901, 916, 919 and 918 to line 921 to the relay PB, which is energized at this time. As soon as the relay PB is energized, the ground to the relay PA via line 916 is disconnected so that the relay PA then remains operated solely under control of the relay PL which will be de-energized as soon as the capacitor 920 is discharged. Therefore, the relays PA and PB will both be energized for a time and then when relay PL is de-energized, relay PA will also be de-energized.

However, as soon as relay PB is energized a holding circuit is established directly to the relay via line 916 and an energizing connection for PC is established via lines 922 and 918 as soon as the relay PL is once again energized. After discharge of the capacitor 920 the relay PL is de-energized, but upon occurrence of this de-energization a ground is once more applied to the relay via line 919 charging the capacitor 920 and subsequently energizing the relay. When the relay is energized, an energizing connection is established to relay PC which is then energized at the same time along with relay PB. With the relay PC energized the direct ground applied to relay PB via line 916 is disconnected and the relay depends for its operation solely upon the connection with line 918 and 919. When the relay PL is once more de-energized by discharge of capacitor 920 the relay PB will also be de-energized.

Upon detection of the closed called line circuit, the operation of the sequence counter and the relay RT will apply a positive potential to the control line CO to the junctor which due to its polarity will energize the relay RT in the junctor and then energize the relay CO. The relay RT serves to connect the called loop to the transmission bridge 301 so that a transmission from the called partly to the calling party through the bridge may take place. When the sequence counter reaches a point where the relay PC is energized in conjunction with the energization of the relay PL, a positive potential will be applied to the line MK to the junctor energizing the relay SR which effects a reversal of battery completing the interconnection between the calling party and the called party.

Since the circuit is automatic, means have to be incorporated to release it in event the call is abandoned before the called subscriber answers. This is effected by a signal from the supervisory processing circuit which recognizes that the calling subscriber has released prior to answer by the called party. A search is then made of the ringing control circuits by application from the register control 206 of the junctor address associated with the abandoned call, the junctor address being applied to the electronic portion (FIG. 8) of each ringing control until a coincidence occurs indicating that the ringing control is associated with the call. At this point a CN reset signal is applied from the register control 206 resetting the control flip flop 850 and over-ride of the busy condition in the ringing control circuit is then effected which results in the energization of the MT and MC relays in the ringing control by means of the register control 206 which in turn caused the operation of relay RT and hence the sequential driving of the sequence counter which provides the release conditions for the circuit. Under these release conditions a negative pulse is first applied to the line CO to the junctor so as to reset the relay RT and set the relay CO. This negative pulse is provided as soon as operation of the relay PA in the sequence counter occurs, the energization of relays RP and SL already having occurred.

After actuation of the relay CO, a negative pulse is applied to the control line T to the junctor under coordinate conditions of energization of relay MT, relay PB, relay RT and de-energization of relay PL and relay PA. The negative pulse on line T in the junctor de-energized relay RD removing the holding ground to the calling party. A positive pulse is applied at this time to control line R to the junctor under conditions of energization of relays RT, relay PA, relay PB, relay PL and relay NT which positive pulse on this control line in the junctor energizes relay TK to extend a dry loop condition to the called line circuit. Then, as soon as the condition of energization of relay PC with PL and without energization of relay PB the relay SL connected to the control line S will be de-energized, removing the holding ground from the relays in the ringing control circuit resulting in a de-energization of the relay CO in the junctor. At this point, all connection between the junctor and shared equipment is disconnected and the junctor is additionally disconnected from both the calling and called line circuits.

In the usual case where a connection is established between the calling and called parties completing the call, an automatic sequence is provided in the system in conjunction with the junctor supervisory and release control 209 for terminating the call and disconnecting all of the equipment in the junctor supervisory processing circuit from the transmission line. As indicated above, when the called party answers the ringing applied to the line circuit, all of the time shared equipment in the common control system is disconnected, leaving only the junctor and the supervisory processing circuit 201 with its junctor memory 203 connected in the line for purposes of monitoring the condition of the line so as to detect an incoming condition such as flashing of either the calling or called line circuits or a termination of the call as detected by an open circuit in either the calling or called line. In this way, the time shared equipment is available for use with other calls thereby considerably reducing the amount of equipment necessary for handling a given number of circuits.

After the call is completed and the junctor memory records the fact that both the calling and called line circuits are closed, as determined by the sensors in the junctor, and that the called subscriber has answered the call, the supervisory processing circuit continues to monitor both the called and calling line circuits. In the case where the calling subscriber releases or terminates the call first, the calling sensor in the junctor detects the open line condition in the calling line circuit and the condition starts the counter in the junctor memory which continues its count until it reaches a value binary 100, which value is then held until the counter is triggered by a one second pulse from the register processor. The one second pulse changes the binary count to 101 which is also held until a second one second pulse is received from the register processor changing the count to 111. At this point, a request is made in the junctor memory for the junctor supervisory and release control, a circuit which effects the termination of the call and releases the junctor.

JUNCTOR RELEASE CONTROL

The junctor supervisory and release control includes an electronic portion shown in FIG. 10A and an electromechanical portion shown in FIG. 10B. The electronic portion provides for a coincidence between the junctor address and the address associated with stored information in the register control 206 with the instruction from the register control being applied to the electromechanical portion of the junctor release control upon coincidence of the two addresses. The junctor release control provides for release of the junctor, release of the SR relay in the junctor, and operation of the SR relay in the junctor for purposes of terminating a call or for use during switch-through trunk calls and non-switch through trunk calls. The circuit provides for a busy store flip flop which indicates through application of a controlled output the condition of the junctor release control during attempted acquisition thereof by the supervisory processing circuit.

The X and Y portion of the junctor address associated with the call requiring the services of the junctor release control is applied via the service link network control 110 and service link network 111 to input address flip flops 1000–1007, which in accordance with the set or reset condition determine the address of the junctor associated therewith. The junctor address stored in the register memory 207 along with appropriate instruction for further processing or control of the system is applied via the service link network control 110 and service link network 111 to input coincidence AND gates 1008–1015 and 1016–1023, to which the set and reset outputs of the flip flops 1000–1007 are also applied.

A coincidence between the two addresses at the coincidence AND gates 1008–1023 enables these AND gates providing a coincidence signal via the OR gates 1024–1031 to control AND gates 1032 and 1033 controlling the X and Y portions of the address, respectively. The flip flops 1032 and 1033 and the outputs of AND gates 1008–1015 and 1016–1023, respectively, applying the resulting control signals to each of the instruction AND gates 1034–1039. Instruction signal for operation of the SR relay in the junctor is applied to the instruction AND gate 1034, a signal for release of the SR relay in the junctor is applied to AND gate 1035, signal for release of the junctor is applied to AND gate 1036, a reset signal is applied to AND gate 1037, and alarm signal is applied to AND gate 1038 and an "enable alarm" signal from the alarm circuit is applied to AND gate 1039.

Thus, upon coincidence of the two addresses applied to the junctor release control the instruction AND gates will be enabled by the application of any instruction signal from the register control 206. The output of AND gate 1034 represents an "operate SR" relay signal applied to information flip flop 1040 setting this flip flop to provide an output for control of the electromechanical portion of the junctor release control in FIG. 10B. In a similar way, the release SR relay signal derived from AND gate 1035 and applied to information flip flop 1041 sets the flip flop and applies a control signal to the electromechanical portion of the system. The release junctor signal derived from AND gate 1036 is applied to information AND gate 32 which sets the AND gate and also applies the control signal to the electromechanical portion of the circuit. The output of AND gate 1037 provides a reset signal which is applied to the information flip flop 1042 and to each of the address flip flops 1000–1007 to reset each of these flip flops. In addition, the reset signal is also applied through a pair of OR gates 1043 and 1044 to reset the information flip flops 1040 and 1041. The OR gates 1043 and 1044 are also used to insure proper setting of the information flip flops 1040 and 1041 by providing complementary signals to the reset side of these flip flops to insure their proper setting for each control.

As in the case of the register buffer 205 and the ringing control circuit 210 a busy store flip flop 1045 is provided in the junctor release control circuit to indicate the busy or free condition of the circuit. Each of the impulses in the junctor address provided from the service link network control are also applied via a plurality of OR gates 1046–1053 to and AND gate 1054. A bit in both the X portion and the Y portion of the junctor address received in the junctor release control will provide for enabling of AND gate 1054 to thereby set the flip flop 1045 to provide an output indicative of the busy condition of the junctor release control circuit.

Looking now to the electromechanical portion of the junctor release control in FIG. 10B there is provided an association with the control signal supplied by the electronic portion of the junctor release control a relay RJT for junctor release, a relay RSR for release of the SR relay in the junctor, and a relay OSR for operation of the SR relay in the junctor. In addition, there is provided control relays OTA and OTB, a control relay ST and a control relay SL. The operation of one of the relays RJT, RSR, or OSR in combination with the operation of the various control relays provides the sequence of events which result either in release of the junctor release of the SR relay or operation of the SR relay. The following description of the operation of the electromechanical portion of the system in conjunction with junctor release will further indicate the various functions of the individual components of this circuit.

After the counter in the junctor memory 203 has reached the count which indicates that the junctor control should be attached to the supervisory processing circuit through the service link network control 110 and service link network 111 a release junctor signal REL JCT is obtained through the electronic portion of the junctor release control from the register control 206 actuating the RJT relay in the electromechanical portion of the system (FIG. 10B). The energization of the RJT relay causes energization of the relay SL thereby applying ground through the service link network to the junctor at control line S providing for connection of the junctor release control to the junctor circuit. As soon as the SL relay is energized, ground is applied via the lines 1060, 1061, 1062, 1063 and 1064 to energize the ST relay. Energization of the ST relay applies this same ground to the relay OPA energizing that relay which simultaneously applies ground to relay OPB energizing that relay also.

As soon as the SL relay was energized, a negative potential was applied via the resistor 1065 to the control line CO to the junctor, which signal due to its polarity will set the CO relay and reset the relay RT. This disconnects the transmission lines T and R from the transmission bridge 301 in the junctor and also disconnects the control leads T, R, S, MK and CO from the transmission lines to the called line circuit. Then upon energization of the relays ST, OPA, and OPB, a negative potential is applied to the output control lines T, R, and MK so as to release the relays RB and SR in the junctor thereby disconnecting the junctor from the calling line circuit. The CO relay in the junctor is then released and the junctor control circuit is separated from the junctor thereby effecting disconnection of the entire control system from the transmission line.

The release of the junctor under conditions where the called party terminates the call first is essentially identical to the sequence described above with regard to termination by the calling party first.

While we have shown and described several embodiments in accordance with the instant invention, it is understood that the same is not limited thereto but is susceptible of numerous changes and modifications as known to a person skilled in the art, and we therefore do not wish to be limited to the details shown and described therein but intend to cover all such changes and modifications as are encompassed by the scope of the appended claims.

We claim:

1. In a telephone system including a line link network, a trunk link network, a service link network, and a plurality of originating and terminating line circuits, a universal junctor system for interconnecting said originating and terminating line circuits connected between said line link network and said trunk link network, comprising:

a main voice transmission path forming originating and terminating direct current loop circuits therein, first and second sensing means inserted in said originating and terminating loop circuits, respectively, and providing first and second states in response to open and closed condition of said loop circuits, interrogating means for periodically detecting the state of said first and second sensing means, junctor memory means for storing the detected state of said first and second loop circuits, relay means for selectively interconnecting said line link network, said trunk link network, and said service link network via said transmission path, and supervisory control means for controlling said relay means in response to changes in the condition of said loop circuits as determined by comparison of the previous state thereof stored in said memory means and the present state thereof detected by said interrogating means.

2. The combination as set forth in claim 1, wherein said first and second sensing means include saturable cores which are saturated upon closing of the direct current loop circuit associated therewith.

3. The combination as set forth in claim 1, wherein said junctor memory means forms part of a memory device having a plurality of memory segments, each memory segment forming a memory means associated with a particular universal junctor system.

4. The combination as set forth in claim 3, wherein said memory device is in the form of a recirculating delay line and each of said memory segments includes a plurality of bit characters.

5. The combination as set forth in claim 4, wherein a first one of said bit characters provides for storage of the detected state of said first and second loop circuits and a second one of said bit characters serves as means for recording the length of time for which said originating loop circuit is opened or closed.

6. The combination as set forth in claim 4, further including electronic scanning means for interconnecting said sensing means, said junctor memory means and said supervisory control means periodically in synchronism with the timing of said recirculating delay line.

7. The combination as set forth in claim 1, wherein said relay means includes a first relay connected in the originating direct current loop circuit of said main voice transmission path.

8. The combination as set forth in claim 7, further including a line connection between said line link network and said universal junctor system, said first relay being connected to said line connection for placing ground thereon to mark through said line link network to an originating line circuit.

9. The combination as set forth in claim 1, wherein said relay means includes a second relay connected in the originating direct current loop circuit of said main voice transmission path for reversal of direct current polarity therein in response to detection of a closed circuit condition in both said originating and terminating loop circuits.

10. The combination as set forth in claim 1, wherein said relay means includes a third relay connected in the terminating direct current loop circuit of said main voice transmission path.

11. The combination as set forth in claim 10, further including a line connection between said trunk link network and said universal junctor system, said third relay being connected to said line connection for placing ground thereon to mark through said trunk link network to a terminating line circuit.

12. The combination as set forth in claim 1, wherein said relay means includes a fourth relay connected in the terminating direct current loop circuit of said main voice transmission path for elimination of direct current from said terminating loop upon connection of said loop to dialable trunks.

13. The combination as set forth in claim 1, wherein said relay means includes a fifth relay for by-passing said transformer in said main voice transmission path.

14. The combination as set forth in claim 1, wherein said relay means includes a sixth relay having a first operative state connecting said service link network to said terminating loop circuit and a second operative state connecting said service link network to said relay means.

15. The combination as set forth in claim 1, further including means for providing a ring-back signal in said originating loop circuit on a transformer induced basis.

16. The combination as set forth in claim 6, wherein said supervisory control means includes register means for analyzing consecutive changes in condition of said originating loop circuit representing dialed impulses to determine the terminating line circuit requested.

17. The combination as set forth in claim 16, wherein said register means includes register memory means for storing said dialed impulses as they are received, said register memory means having a plurality of memory segments, each associated with a particular universal junctor system and each available for access in a timed sequence.

18. The combination as set forth in claim 17, wherein said junctor memory means and said register memory means operate asynchronously.

19. The combination as set forth in claim 18, further including means for associating said register means with said service link network on a time share basis.

20. In a telephone system, a line link network including a plurality of originating line circuits, a trunk network including a plurality of terminating line circuits, a plurality of universal junctor means coupled between said line link network and said trunk link network for interconnecting a selected one of said originating line circuits with a designated one of said terminating line circuits, and including sensing means for detecting the open and closed conditions of said line circuits, and relay means, a memory including a plurality of memory segments, each memory segment being associated with a particular one of said universal junctor means for storing at least the condition of line circuits connected thereto and being available in a first timed sequence, supervisory means for comparing data from said sensing means in each junctor means with data from said memory to detect changes in condition of said line circuits, scanning means for connecting each junctor means and said memory means to said supervisory means in said first timed sequence, a plurality of common contril circuits for control of said relay means in each junctor means and said originating and terminating line circuits connected thereto, service link network means for connecting said common control circuits to each junctor means in response to control by said supervisory means, and register means for analyzing consecutive changes in the sensing means in said plurality of junctors of the originating line to determine the terminating line circuit requested.

21. The combination as set forth in claim 20, wherein said memory is in the form of a recirculating delay line and each of said memory segment includes a plurality of bit characters, a first one of said bit characters providing for storage of the detected state of said originating and terminating line circuits, and a second one of said bit characters serving as means for recording the length of time for which said originating line circuit is opened or closed.

22. The combination as set forth in claim 20, further including means for connecting said register means to said common control circuits on a time share basis to effect timing and control thereof.

23. The combination as set forth in claim 22, further including a line connection between said line link network and each universal junctor means in addition to said line circuits, said relay means including a first relay connected between said line connection and ground for marking through said line link network to an originating line circuit.

24. The combination as set forth in claim 23, wherein each junctor means includes a main voice transmission path having a transformer therein interconnecting said line link network and said trunk link network, said first relay being connected in said transmission path on the side of said transformer connected to said line link network.

25. The combination as set forth in claim 24, wherein said relay means includes a second relay connected in said transmission path on the side of said transformer connected to said line link network, said second relay being responsive to said supervisory means detecting a change in state of a terminating line circuit connected to the junctor means from open to closed in coincidence with a closed condition of the originating line circuit to reverse the direct current polarity to said originating line circuit.

26. The combination as set forth in claim 25, wherein said line connection extends also to said trunk link network from said junctor means, said relay means further including a third relay connected between said line connection and ground for marking through said trunk link network to a terminating line circuit.

27. The combination as set forth in claim 26, wherein said third relay is connected in said transmission path on the side of said transformer connected to said trunk link network.

28. The combination as set forth in claim 27, wherein said relay means further includes a fifth relay connected in said transmission path for by-passing said transformer.

29. The combination as set forth in claim 28, wherein said relay means includes a fourth bipolar relay connecting said service link network to said terminating line circuit in one state thereof and connecting said service link network to said relay means in another state thereof.

30. The combination as set forth in claim 22, wherein said register means includes register memory means for storing said dialed impulses as they are received, said register memory means having a plurality of memory segments, each associated with a particular junctor means and each available for access in a timed sequence.

31. The combination as set forth in claim 30, wherein said memory associated with said junctor means and said register memory means operate asynchronously.

32. The combination as set forth in claim 31, further including means for providing a ringback signal in said originating line circuit on a transformer induced basis and ringing in said terminating line circuit upon opening of said third relay and actuation of said fourth bipolar relay to said one state thereof.

References Cited

UNITED STATES PATENTS

| | | |
|---|---|---|
| 3,336,442 | 8/1967 | Casterline et al. |
| 3,334,189 | 8/1967 | Soos. |

KATHLEEN H. CLARK, Primary Examiner

T. M. BROWN, Assistant Examiner